(12) United States Patent
Kwon et al.

(10) Patent No.: US 11,718,145 B2
(45) Date of Patent: Aug. 8, 2023

(54) HVAC SYSTEM HAVING AIR-CONDITIONING CHANNELS FOR TARGET SEATS

(71) Applicants: HYUNDAI MOTOR COMPANY, Seoul (KR); KIA MOTORS CORPORATION, Seoul (KR)

(72) Inventors: Dong Ho Kwon, Yongin-si (KR); Seung Hyeok Chang, Suwon-si (KR); Dae Ig Jung, Suwon-si (KR); Gee Young Shin, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 167 days.

(21) Appl. No.: 16/745,036

(22) Filed: Jan. 16, 2020

(65) Prior Publication Data
US 2021/0070132 A1 Mar. 11, 2021

(30) Foreign Application Priority Data
Sep. 9, 2019 (KR) .......................... 10-2019-0111689

(51) Int. Cl.
*B60H 1/00* (2006.01)
(52) U.S. Cl.
CPC ..... *B60H 1/00285* (2013.01); *B60H 1/00007* (2013.01); *B60H 1/00664* (2013.01);
(Continued)

(58) Field of Classification Search
CPC ............ B60H 1/00285; B60H 1/00007; B60H 1/00664; B60H 1/00742; B60H 1/00821;
(Continued)

(56) References Cited

U.S. PATENT DOCUMENTS 2,724,556 A * 11/1955 Brubaker ........... B60H 1/00207
454/162
2,922,290 A * 1/1960 Carraway ............... F25B 27/00
219/202
(Continued)

FOREIGN PATENT DOCUMENTS

DE 19910390 A1 * 9/1999 ......... B60H 1/00285
DE 102014118116 A1 * 12/2015 ......... B60H 1/00742
(Continued)

*Primary Examiner* — Ljiljana V. Ciric
(74) *Attorney, Agent, or Firm* — Lempia Summerfield Katz LLC

(57) ABSTRACT

A heating, ventilation, and air conditioning (HVAC) system of a vehicle. The HVAC system includes: an air-conditioning unit including a blower, a heater unit, and a cooling unit, and a temperature adjustment door making conditioned-air pass through the heater unit or the cooling unit; and an air-conditioning channel unit including a plurality of discharge channels, through which the conditioned-air is discharged from the air-conditioning unit to specific seats or interior air is returned to the specific seats. The air-conditioning channel unit further includes doors disposed in the plurality of discharge channels so as to control discharging of the conditioned-air to the specific seats and returning of the conditioned-air from the specific seats to re-circulate.

19 Claims, 20 Drawing Sheets

(52) U.S. Cl.
CPC ..... *B60H 1/00742* (2013.01); *B60H 1/00821* (2013.01); *B60H 1/00878* (2013.01); *B60H 1/00835* (2013.01); *B60H 2001/003* (2013.01); *B60H 2001/00185* (2013.01); *B60H 2001/00961* (2019.05)

(58) Field of Classification Search
CPC ............ B60H 1/00878; B60H 1/00835; B60H 2001/00185; B60H 2001/003; B60H 2001/00961; B60H 1/00392; B60H 1/00028
See application file for complete search history.

(56) References Cited

U.S. PATENT DOCUMENTS

| | | | | |
|---|---|---|---|---|
| 3,096,938 A * | 7/1963 | Cole | ........................ | B60H 1/18 237/12.3 A |
| 3,394,887 A * | 7/1968 | Megargle | ........... | B60H 1/00285 237/28 |
| 3,595,029 A * | 7/1971 | Lende, Jr. | .......... | B60H 1/00207 62/507 |
| 4,375,754 A * | 3/1983 | Okura | ................ | B60H 1/00742 236/49.3 |
| 4,426,852 A * | 1/1984 | Nishimura | ......... | G05D 23/1917 165/247 |
| 4,462,218 A * | 7/1984 | Yamanaka | ......... | B60H 1/00742 62/175 |
| 4,572,430 A * | 2/1986 | Takagi | ............... | B60H 1/00285 219/202 |
| 4,788,904 A * | 12/1988 | Radtke | ............... | B60H 1/00295 454/900 |
| 4,991,405 A * | 2/1991 | Sakano | ............. | B60H 1/00007 62/428 |
| 5,275,012 A * | 1/1994 | Dage | .................. | B60H 1/00764 219/202 |
| 5,450,894 A * | 9/1995 | Inoue | ................ | B60H 1/00842 454/907 |
| 5,673,964 A * | 10/1997 | Roan | .................. | B60H 1/00842 296/70 |
| 5,921,100 A * | 7/1999 | Yoshinori | ............ | B60N 2/5657 219/202 |
| 6,059,018 A * | 5/2000 | Yoshinori | .......... | B60H 1/00285 165/41 |
| 6,079,485 A * | 6/2000 | Esaki | ................. | B60H 1/00735 219/202 |
| 6,105,667 A * | 8/2000 | Yoshinori | .......... | B60H 1/00285 219/202 |
| 6,776,451 B2 * | 8/2004 | Crean | ................ | B60H 1/00364 296/156 |
| 6,871,696 B2 * | 3/2005 | Aoki | .................. | B60H 1/00285 165/203 |
| 6,872,135 B2 * | 3/2005 | Currle | .................... | B60H 1/247 454/139 |
| 7,477,969 B2 * | 1/2009 | Panic | ................... | B60N 2/5678 219/217 |
| 8,366,524 B2 * | 2/2013 | Ichikawa | ........... | B60H 1/00378 454/69 |
| 9,168,810 B2 * | 10/2015 | Ghosh | ..................... | B60H 1/247 |
| 9,966,640 B2 * | 5/2018 | Kumagai | ................ | B60L 58/26 |
| 10,618,371 B2 * | 4/2020 | Ochiai | .............. | B60H 1/00207 |
| 11,104,201 B2 * | 8/2021 | Hötzel | ................ | B60H 1/2226 |
| 2001/0004008 A1 * | 6/2001 | Aoki | .................... | B60N 2/5628 454/120 |
| 2001/0022222 A1 * | 9/2001 | Aoki | .................... | B60N 2/5657 165/203 |
| 2001/0029162 A1 * | 10/2001 | Yoshinori | ............... | B60H 1/247 454/140 |
| 2002/0019213 A1 * | 2/2002 | Yoshinori | ........... | B60H 1/00742 454/155 |
| 2003/0109212 A1 * | 6/2003 | Hayashi | ............... | B60N 2/5657 454/56 |
| 2004/0067727 A1 * | 4/2004 | Aoki | .................... | B60N 2/5628 454/120 |
| 2004/0079099 A1 * | 4/2004 | Kumada | ............ | B60H 1/00742 165/203 |
| 2005/0028542 A1 * | 2/2005 | Yoshida | ............... | H01M 10/625 62/186 |
| 2005/0039902 A1 * | 2/2005 | Oga | .................... | B60H 1/00821 165/203 |
| 2005/0067158 A1 * | 3/2005 | Ito | ....................... | B60H 1/00007 165/204 |
| 2005/0072554 A1 * | 4/2005 | Shindo | ............... | B60H 1/00007 165/122 |
| 2005/0098640 A1 * | 5/2005 | Ichishi | ............... | B60H 1/00742 236/49.3 |
| 2005/0103488 A1 * | 5/2005 | Ichishi | ..................... | G01K 7/42 374/E7.042 |
| 2005/0188849 A1 * | 9/2005 | Yoneno | ................. | B60N 2/5657 96/143 |
| 2005/0267646 A1 * | 12/2005 | Ichishi | ................... | G05D 23/27 165/204 |
| 2006/0042788 A1 * | 3/2006 | Naruse | ............... | B60H 1/00985 62/239 |
| 2006/0060344 A1 * | 3/2006 | Esaki | ................... | B60N 2/5825 165/287 |
| 2008/0016892 A1 * | 1/2008 | Jang | ..................... | B60N 2/5657 62/244 |
| 2008/0139102 A1 * | 6/2008 | Major | ................ | B60H 1/00278 454/139 |
| 2008/0248736 A1 * | 10/2008 | Aoki | .................... | B60H 1/00742 454/75 |
| 2008/0256967 A1 * | 10/2008 | Errington | ............ | B60H 1/00742 62/244 |
| 2009/0031742 A1 * | 2/2009 | Seo | ..................... | B60H 1/00285 297/180.14 |
| 2009/0078400 A1 * | 3/2009 | Tamura | ............. | H01M 10/6568 165/287 |
| 2009/0176150 A1 * | 7/2009 | Yanaka | ............... | H01M 10/633 429/120 |
| 2011/0165830 A1 * | 7/2011 | Smith | ................ | B60H 1/00278 454/75 |
| 2011/0226461 A1 * | 9/2011 | Fujii | ..................... | B60N 2/5635 165/47 |
| 2012/0202413 A1 * | 8/2012 | Kawashima | ......... | B60N 2/5635 454/75 |
| 2012/0247747 A1 * | 10/2012 | DiGasbarro | ....... | B60H 1/00028 165/122 |
| 2012/0252340 A1 * | 10/2012 | Gannon | ............. | B60H 1/00028 454/75 |
| 2012/0312520 A1 * | 12/2012 | Hoke | ..................... | B60N 2/002 219/217 |
| 2012/0315835 A1 * | 12/2012 | Maranville | ........ | B60H 1/00742 454/75 |
| 2013/0025310 A1 * | 1/2013 | Itoh | .................... | B60H 1/00064 62/186 |
| 2013/0068440 A1 * | 3/2013 | Kamiyama | ......... | B60H 1/00849 165/202 |
| 2013/0092364 A1 * | 4/2013 | Kumar | ..................... | F24F 11/30 165/237 |
| 2013/0145792 A1 * | 6/2013 | Toyama | .................... | F25B 1/00 62/498 |
| 2016/0016455 A1 * | 1/2016 | Miyagawa | ......... | B60H 1/00742 62/133 |
| 2016/0144685 A1 * | 5/2016 | Ochiai | ............... | B60H 1/00207 165/204 |
| 2016/0250905 A1 * | 9/2016 | Tanaka | ................. | B60N 2/5657 454/75 |
| 2016/0272038 A1 * | 9/2016 | Tanaka | ..................... | B60N 2/56 |
| 2016/0280038 A1 * | 9/2016 | Tanaka | ............... | B60H 1/00521 |
| 2017/0008368 A1 * | 1/2017 | Tanaka | ................ | F04D 29/4226 |
| 2017/0341485 A1 * | 11/2017 | Yoneda | ..................... | A61B 5/01 |
| 2018/0117987 A1 * | 5/2018 | Yamaoka | ............ | B60N 2/5657 |
| 2018/0272835 A1 * | 9/2018 | Fujii | ................ | B60H 1/00285 |
| 2019/0047449 A1 * | 2/2019 | Fujii | ..................... | B60N 2/5657 |
| 2019/0054793 A1 * | 2/2019 | Fujii | ................ | B60H 1/00285 |
| 2019/0135073 A1 * | 5/2019 | Higashihara | ......... | B60N 2/5628 |
| 2019/0351735 A1 * | 11/2019 | Kawano | ..................... | A47C 7/74 |

(56) References Cited

U.S. PATENT DOCUMENTS

| | | | |
|---|---|---|---|
| 2019/0351742 A1* | 11/2019 | Fujii | B60N 2/5635 |
| 2019/0366794 A1* | 12/2019 | Agathocleous | B60H 1/00485 |
| 2020/0016957 A1* | 1/2020 | Chikagawa | B60H 1/3202 |
| 2020/0039322 A1* | 2/2020 | Soto Infante | B60H 1/00842 |
| 2020/0062074 A1* | 2/2020 | MacNeille | B60H 1/00735 |
| 2020/0101812 A1* | 4/2020 | Terai | B60H 1/00028 |
| 2020/0171915 A1* | 6/2020 | Sakurai | B60H 1/245 |
| 2020/0207179 A1* | 7/2020 | Han | B60H 1/00207 |
| 2020/0391572 A1* | 12/2020 | Tsukagishi | B60H 1/00428 |
| 2021/0039476 A1* | 2/2021 | Suzuki | B60N 2/5628 |
| 2021/0053416 A1* | 2/2021 | Suzuki | B60H 1/3216 |
| 2021/0101446 A1* | 4/2021 | Nakanishi | B60H 1/00407 |
| 2021/0129624 A1* | 5/2021 | Nagahama | B60H 1/00792 |
| 2022/0032724 A1* | 2/2022 | Rotenburg | B60H 1/00499 |
| 2022/0126648 A1* | 4/2022 | Hong | B60H 1/00735 |
| 2022/0185059 A1* | 6/2022 | Terai | B60H 1/00028 |

FOREIGN PATENT DOCUMENTS

| | | | |
|---|---|---|---|
| EP | 1950084 A1 * | 7/2008 | B60H 1/00285 |
| EP | 1723876 B2 * | 6/2022 | B60N 2/5635 |
| JP | 2003-159929 A | 6/2003 | |
| KR | 10-2013-0093244 A | 8/2013 | |
| KR | 10-2018-0041997 A | 4/2018 | |
| KR | 10-2018-0067761 A | 6/2018 | |

* cited by examiner

HVAC SYSTEM HAVING AIR-CONDITIONING CHANNELS FOR TARGET SEATS

CROSS REFERENCE TO RELATED APPLICATION

This application claims priority to and the benefit of Korean Patent Application No. 10-2019-0111689, filed on Sep. 9, 2019, the entire contents of which are incorporated herein by reference.

FIELD

The present disclosure relates to a heating, ventilation, and air conditioning (HVAC) system of a vehicle that can perform individual air-conditioning for seats when cooling and heating a vehicle.

BACKGROUND

The statements in this section merely provide background information related to the present disclosure and may not constitute prior art.

Recently, implementation of an eco-friendly technology and solutions for problems such as energy exhaustion are rising as social issues associated with an electric vehicle. An electric vehicle is driven by a motor that outputs power by being supplied with electricity from a battery. Accordingly, an electric vehicle has advantages of not discharging carbon dioxide, generating a little noise, and having a higher energy efficiency of a motor than the energy efficiency of an engine, so it has been spotlighted as an eco-friendly vehicle.

The core technology for achieving such an electric vehicle is the technology related to a battery module, and recently, studies for reducing the weight and size of a battery and decreasing the charge time have been actively conducted. A battery module can maintain optimal performance and a long lifespan when it is used in an optimal temperature environment. However, it is substantially difficult to use a battery module in an optimal temperature environment due to heat that is generated in operation and a change of external temperature.

Further, an electric vehicle has no waste heat source that is generated by combustion in a specific engine such as an internal combustion engine, so the interior of the electric vehicle is heated with an electric heating device in wintertime. Further, warming-up is desired to improve the charge/discharge performance of a battery in an intense cold period, so a separate cooling water heating-type electric heater is used. That is, a technology of operating a heating/cooling system for controlling the temperature of a battery module separately from a heating/cooling system for interior air-conditioning of a vehicle in order to maintain an optimal temperature environment for the battery module has been adopted.

Interior air-conditioning is performed also in an electric vehicle to improve the interior environment, but we have discovered that when the entire interior is cooled or heated without separating the driver seat and passenger seats in interior air-conditioning, the air-conditioning efficiency decreases, and accordingly, electrical energy is wasted.

SUMMARY

The present disclosure provides an HVAC system of a vehicle that increases air-conditioning efficiency by reducing a waste of cooling/heating energy by individually performing air-conditioning for seats, depending on whether there are passengers sitting in the seats.

In one form of the present disclosure, an HVAC system of a vehicle includes: an air-conditioning unit including a blower, a heater unit, and a cooling unit, and a temperature adjustment door making conditioned-air pass through the heater unit or the cooling unit; and an air-conditioning channel unit including a plurality of discharge channels, through which conditioned-air is discharged from the air-conditioning unit to specific seats or interior air is returned from the specific seats, and doors disposed in the discharge channels so that the conditioned-air is discharged to specific seats and then returned from the specific seats to re-circulate.

In one form, the air-conditioning channel unit may include: a first air-conditioning channel unit having a plurality of discharge channels for discharging conditioned-air or returning interior air for a first seat and having doors respectively disposed in the discharge channels; and a second air-conditioning channel unit having a plurality of discharge channels for discharging conditioned-air or returning interior air for a second seat and having doors respectively disposed in the discharge channels.

The discharge channels of the first air-conditioning channel unit may include: a first upper vent channel being open toward an upper portion of the first seat, a first upper return channel being open toward the blower from the first upper vent channel, a first lower vent channel being open toward a lower portion of the first seat, and a first lower return channel being open toward the blower from the first lower vent channel; and the doors of the first air-conditioning channel unit may include a first upper vent door selectively opening and closing the first upper vent channel or first upper return channel, and a first lower vent door selectively opening and closing the first lower vent channel or the first lower return channel.

The discharge channels of the second air-conditioning channel unit may include a second upper vent channel being open toward an upper portion of the second seat, a second upper return channel being open toward the blower from the second upper vent channel, a second lower vent channel being open toward a lower portion of the second seat, and a second lower return channel being open toward the blower from the second lower vent channel; and the doors of the second air-conditioning channel unit may include a second upper vent door selectively opening and closing the second upper vent channel or second upper return channel, and a second lower vent door selectively opening and closing the second lower vent channel or the second lower return channel.

In one form, the first upper vent channel and the second upper vent channel may be configured to discharge cooling air that has passed through the cooling unit, and the first lower vent channel and the second lower vent channel are configured to discharge heating air that has passed through the heater unit.

In other form, the air-conditioning unit may include: an internal/external air door; a first return door determining whether to return the interior air to the blower from the first air-conditioning channel unit; a second return door determining whether to return the interior air to the blower from the second air-conditioning channel unit; a defrost channel; a defrost return channel being open toward the blower from the defrost channel; and a defrost door selectively opening and closing the defrost channel and the defrost return channel.

The interior air returned through the first upper return channel, the first lower return channel, the second upper return channel, the second lower return channel, and the defrost return channel may be re-circulated to the blower through extension ducts being open toward the blower.

The HVAC system may further include a controller collecting interior temperature information and passenger-sitting information and controlling the temperature adjustment door, the doors of the first air-conditioning channel unit, and the doors of the second air-conditioning channel unit in accordance with operation modes according to the interior temperature and the passenger-sitting information.

When the operation mode is a cooling mode and there is a passenger sitting in the first seat, the controller may control the temperature adjustment door such that conditioned-air passes through the cooling unit, and may control the first upper vent door to open the first upper vent channel, the first lower vent door to open the first lower return channel, the first return door to open, and the other doors to close.

When the operation mode is a cooling mode, there is a passenger sitting in the first seat, and it is desired to enhance return of the interior air, the controller may control the temperature adjustment door such that conditioned-air passes through the cooling unit, and may control the first upper vent door to open the first upper vent channel, the first lower vent door to open the first lower return channel, the second upper vent door to open the second upper return channel, the second lower vent door to open the second lower return channel, and the first return door and the second return door to open.

When the operation mode is a cooling mode and there are passengers sitting in the first seat and the second seat, the controller may control the temperature adjustment door such that conditioned-air passes through the cooling unit, and may control the first upper vent door to open the first upper vent channel, the first lower vent door to open the first lower return channel, the second upper vent door to open the second upper vent channel, the second lower vent door to open the second lower return channel, and the first return door and the second return door to open.

In a cooling mode, the controller may control the defrost door to close the defrost channel and open the defrost return channel.

When the operation mode is a heating mode and there is a passenger sitting in the first seat, the controller may control the temperature adjustment door such that conditioned-air passes through the heater unit, and may control the internal/external air door to open, the first upper vent door to open the first upper return channel, the first lower vent door to open the first lower vent channel, and the first return door to open.

When the operation mode is a heating mode, there is a passenger sitting in the first seat, and it is desired to enhance return of the interior air, the controller may control the temperature adjustment door such that conditioned-air passes through the heater unit, and may control the internal/external air door to open, the first upper vent door to open the first upper return channel, the first lower vent door to open the first lower vent channel, the second upper vent door to open the second upper return channel, the second lower vent door to open the second lower return channel, and the first return door and the second return door to open.

When the operation mode is a heating mode and there are passengers sitting in the first seat and the second seat, the controller may control temperature adjustment door such that conditioned-air passes through the heater unit, and may control the first upper vent door to open the first upper return channel, the first lower vent door to open the first lower vent channel, the second upper vent door to open the second upper return channel, the second lower vent door to open the second lower vent channel, and the first return door and the second return door to open.

In a heating mode, the controller may control the defrost door to open the defrost channel and close the defrost return channel.

When there is a passenger sitting in the first seat and the operation mode is a temperature adjustment mode of the interior air, the controller may control the temperature adjustment door such that conditioned-air passes through the heater unit, and may control the internal/external air door to open, the first upper vent door to open the first upper vent channel, the first lower vent door to open the first lower vent channel, and the first return door to open.

When there are passengers sitting in the first seat and the second seat and the operation mode is a temperature adjustment mode of the interior air, the controller may control the temperature adjustment door such that conditioned-air passes through the cooling unit and heater unit, and may control the internal/external air door to open, the first upper vent door to open the first upper vent channel, the first lower vent door to open the first lower vent channel, the second upper vent door to open the second upper vent channel, the second lower vent door to open the second lower vent channel, and the first return door and the second return door to open.

In a temperature adjustment mode of the interior air, the controller controls the defrost door to open defrost return channel and close the defrost channel.

The HVAC system of a vehicle having the structure described above increases air-conditioning efficiency by preventing a waste of cooling/heating energy by individually performing air-conditioning for seats, depending on whether there are passengers sitting in the seats and then increases the range of an electric vehicle due to the increase in air-conditioning efficiency.

In order that the disclosure may be well understood, there will now be described various forms thereof, given by way of example, reference being made to the accompanying drawings, in which:

DRAWINGS

In order that the disclosure may be well understood, there will now be described various forms thereof, given by way of example, reference being made to the accompanying drawings, in which.

Figure 1:
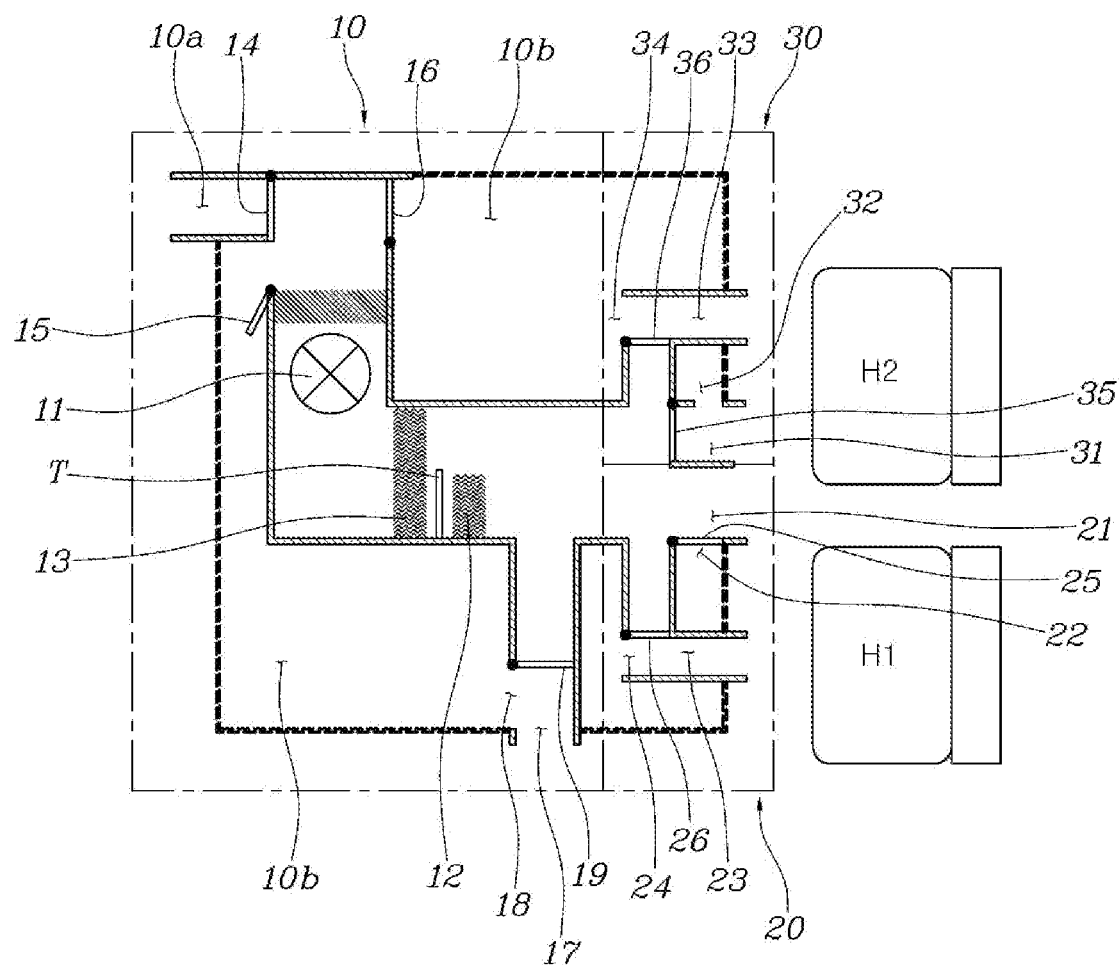
FIG. 1 is an air-conditioning circuit diagram of an HVAC system of a vehicle according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

An HVAC system of a vehicle according to exemplary forms of the present disclosure is described hereafter with reference to the accompanying drawings.

Figure 2:
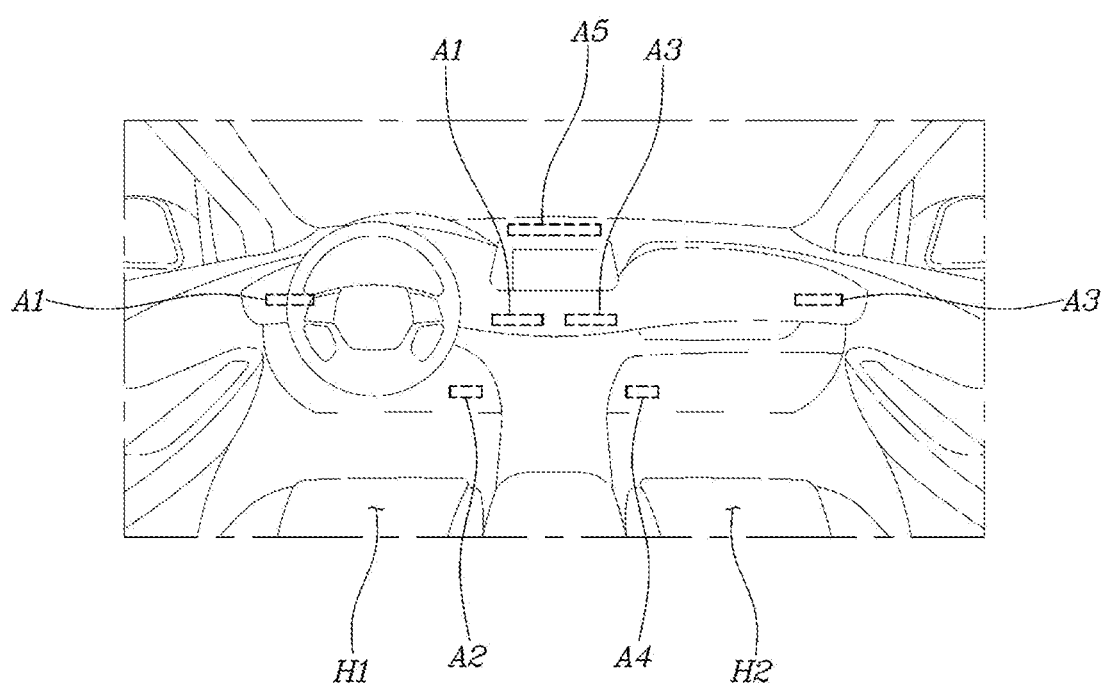
FIG. 2 is a view showing seat-classified air-conditioning by the HVAC system of a vehicle shown in FIG. 1.
Figure 3:
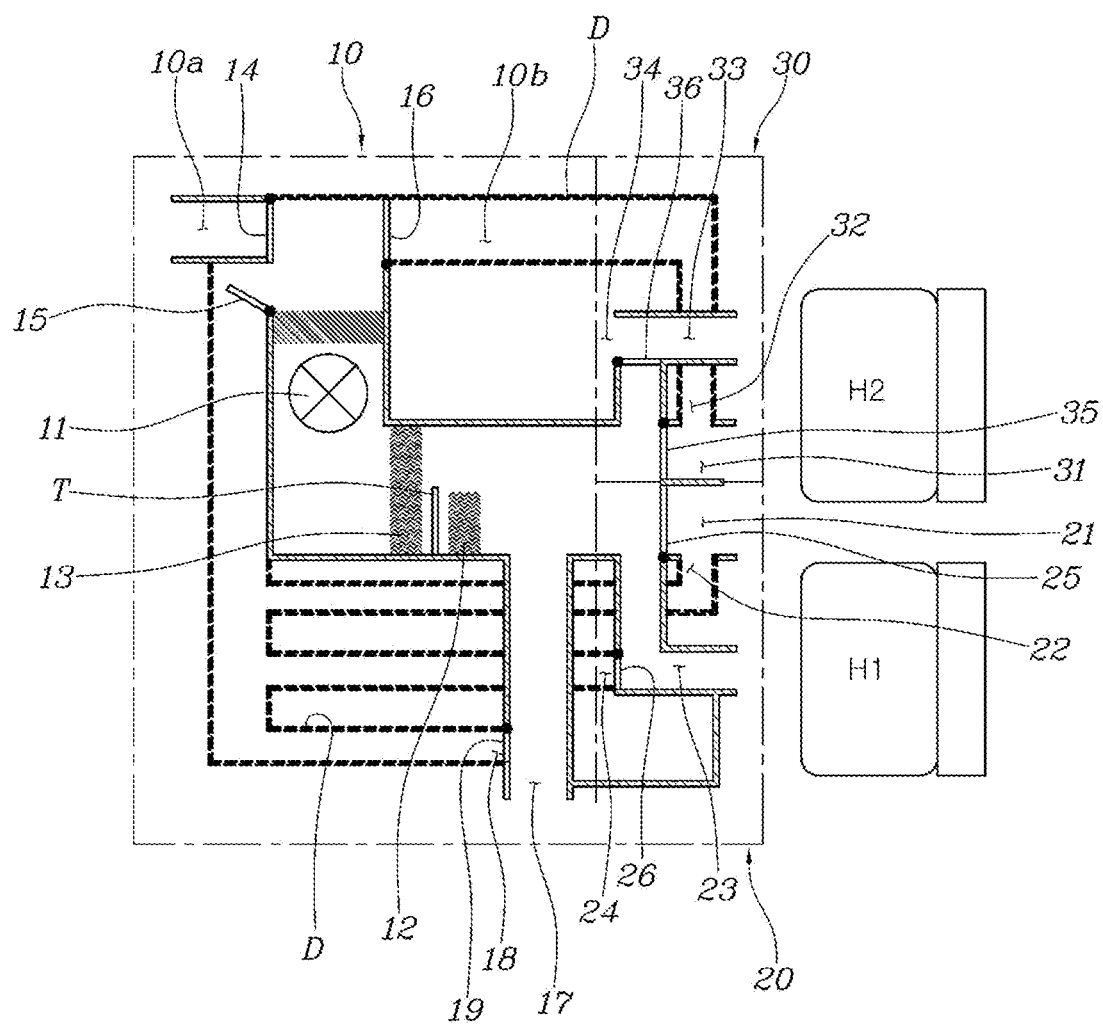
FIG. 3 is an air-conditioning circuit diagram of an HVAC system of a vehicle according to another form of the present disclosure.
Figure 19:
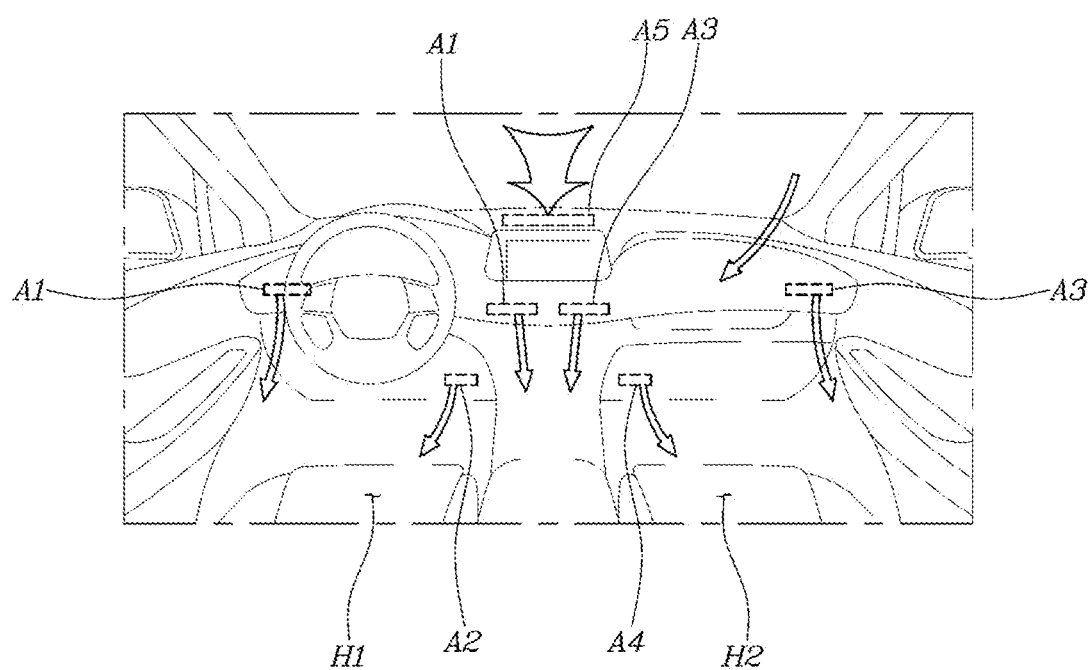
Figure 20:
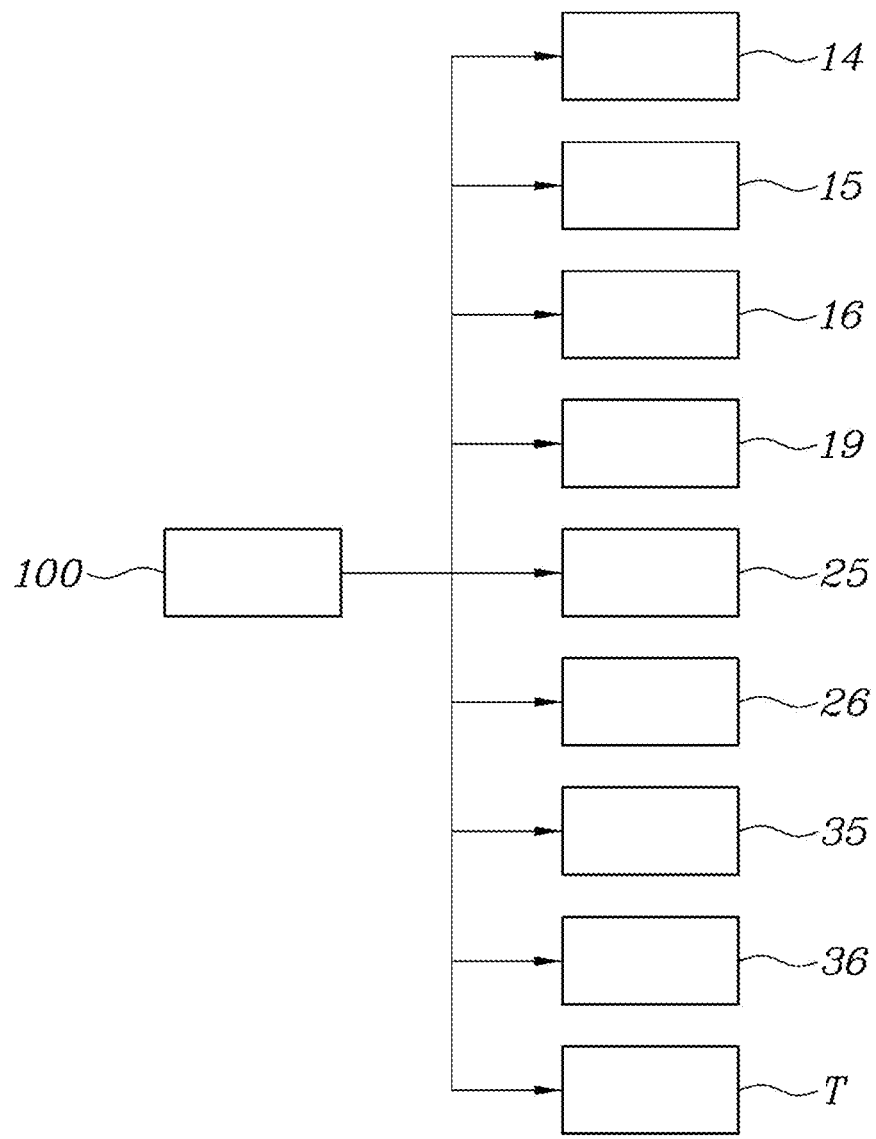
FIG. 20 is a view showing the configuration of the HVAC system of a vehicle according to one form of the present disclosure.

FIG. 1 is an air-conditioning circuit diagram of an HVAC system of a vehicle according to one form of the present disclosure, FIG. 2 is a view showing seat-classified air-conditioning by the HVAC system of a vehicle shown in FIG. 1, FIG. 3 is an air-conditioning circuit diagram of an HVAC system of a vehicle according to another form of the present disclosure, FIGS. 4 to 19 are views illustrating the operation according to air-conditioning mode of the HVAC system of a vehicle shown in FIG. 1, and FIG. 20 is a view showing the configuration of the HVAC system of a vehicle according to one form of the present disclosure.

As shown in FIG. 1, an HVAC system of a vehicle, includes: an air-conditioning unit 10 including a blower 11, a heater unit 12, and a cooling unit 13, and a temperature adjustment door T making conditioned-air pass through the heater unit 12 or the cooling unit 13; and an air-conditioning channel unit including a plurality of discharge channels, through which conditioned-air is discharged from the air-conditioning unit 10 to specific seats or interior air is returned from the specific seats, and doors disposed in the discharge channels so that the conditioned-air is discharged to specific seats and then returned from the specific seats to re-circulate.

That is, in the air-conditioning unit 10, air is blown by the blower 11 and passes through the heater unit 12 or the cooling unit 13, depending on the position of the temperature adjustment door T, whereby the temperature of the conditioned-air is adjusted. The conditioned-air with adjusted temperature is discharged through the discharge channels, thereby being provided to specific seats. Further, the conditioned-air provided to a specific seat in the interior re-circulates to be returned through the discharge channel at the specific seat, so the conditioned-air circulates only in the areas that desire the conditioned-air, whereby a waste of cooling/heating energy is prevented and air-conditioning efficiency is increased. As the air-conditioning efficiency is increased, the range of an electric vehicle is increased.

The air-conditioning channel unit includes: a first air-conditioning channel unit 20 that has a plurality of discharge channels for discharging conditioned-air or returning interior air for a first seat H1 and has doors respectively disposed in the discharge channels; and a second air-conditioning channel unit 30 that has a plurality of discharge channels for discharging conditioned-air or returning interior air for a second seat H2 and has doors respectively disposed in the discharge channels. Accordingly, conditioned-air for cooling/heating can be discharged to any one of the first seat H1 or the second seat H2 and then re-circulated to the first seat H1 or the second seat H2.

As described above, the HVAC system is configured to blow air-conditioning for cooling/heating to respective seats in the interior or to return and re-circulate interior air through the first air-conditioning channel unit 20 and the second air-conditioning channel unit 30 in the air-conditioning unit 10.

The first air-conditioning channel unit 20 and the second air-conditioning channel unit 30 are included in the air-conditioning unit 10. Air blown by the blower 11 in the in the air-conditioning unit 10 passes through the heater unit 12 and the cooling unit 13, and then the flow channels in the first air-conditioning channel unit 20 or the second air-conditioning channel unit 30 are switched, so conditioned-air is blown or interior air is returned for the first seat H1 or the second seat H2. The heater unit 12 for adjusting the temperature of conditioned-air may be a PCT element or a heater coil and the cooing unit 13 may be an evaporator core, so heating air or cooling air can be produced using heat exchange by circulation of a coolant.

In particular, the first air-conditioning channel unit 20 and the second air-conditioning channel unit 30 are configured to discharge conditioned-air for cooling/heating to the first seat H1 or the second seat H2, or to return interior air. That is, a pluralities of discharge channels and doors are provide in each of the first air-conditioning channel unit 20 and the second air-conditioning channel unit 30, so discharge of conditioned-air or return of interior air can be selectively performed, depending on the opening/closing positions of the doors. Accordingly, conditioned-air can be discharged to any one of the first seat H1 or the second seat H2 and then re-circulated to the first seat H1 or the second seat H2, so the conditioned-air circulates through only any one of the seats, whereby preventing a waste of energy due to cooling/heating for an unnecessary area.

As illustrated in FIG. 1, the discharge channels of the first air-conditioning channel unit 20 may include: a first upper vent channel 21 being open toward the upper portion of the first seat H1, a first upper return channel 22 being open toward the blower 11 from the first upper vent channel 21, a first lower vent channel 23 being open toward the lower portion of the first seat H1, and a first lower return channel 24 being open toward the blower 11 from the first lower vent channel 23. The doors of the first air-conditioning channel unit 20 may include a first upper vent door 25 selectively opening/closing the first upper vent channel 21 or first upper return channel 22, and a first lower vent door 26 selectively opening/closing the first lower vent channel 23 or the first lower return channel 24.

Meanwhile, the discharge channels of the second air-conditioning channel unit 30 may include: a second upper vent channel 31 being open toward the upper portion of the second seat H2, a second upper return channel 32 being open toward the blower 11 from the second upper vent channel 31, a second lower vent channel 33 being open toward the lower portion of the second seat H2, and a second lower return channel 34 being open toward the blower 11 from the second lower vent channel 33. The doors of the second air-conditioning channel unit 30 may include a second upper vent door 35 selectively opening/closing the second upper vent channel 31 or the second upper return channel 32, and a second lower vent door 36 selectively opening/closing the second lower vent channel 33 or the second lower return channel 34.

In this form, the first air-conditioning channel unit 20 corresponds to the first seat H1 and the first seat H1 may be a driver seat, while the second air-conditioning channel unit 30 corresponds to the second seat H2 and the second seat H2 may be a passenger seat.

Accordingly, the first upper vent channel 21 is open toward the first seat H1 that is a driver seat from a dashboard, the first lower vent channel 23 is open to the lower portion of the first seat H1, the second upper vent channel 31 is open toward the second seat H2 that is a passenger seat from the dashboard, and the second lower vent channel 33 is open to the lower portion of the second seat H2. Further, there are provided the first upper return channel 22 and the first lower return channel 24 respectively diverging from the first upper vent channel 21 and the first lower vent channel 23 and being open to the blower 11, and conditioned-air is discharged to the interior or interior air is returned, depending on the opening/closing positions of the first upper vent door 25 and the first lower vent door 26. In the same way, there are provided the second upper return channel 32 and the second lower return channel 34 respectively diverging from the second upper vent channel 31 and the second lower vent channel and being open to the blower 11, and conditioned-air is discharged to the interior or interior air is returned, depending on the opening/closing positions of the second upper vent door 35 and the second lower vent door 36.

The operation relationship of the first upper vent channel 21, the first upper return channel 22, and the first upper vent door 25 in this configuration is exemplarily described. When the first upper vent door 25 is positioned to open the first upper vent channel 21 and close the first upper return channel 22 with the blower 11 in operation, the conditioned-air blown by the blower 11 can be discharged to the first seat H1 through the first upper vent channel 21. On the contrary, when the first upper vent door 25 is positioned to close the first upper vent channel 21 and open the first upper return channel 22, the interior air is suctioned inside through the first upper return channel 22 and re-circulated in the air-conditioning unit 10 by operation of the blower 11.

This operation relationship is the same as the operation relationships of the second upper vent channel 31, the second upper return channel 32, and the second upper vent door 35; the first lower vent channel 23, the first lower return channel 24, and the first lower vent door 26; and the second lower vent channel 33, the second lower return channel 34, and the second lower vent door 36. Accordingly, as can be seen from FIG. 2, air can be discharged or returned through a first upper vent hole A1 formed toward the upper portion of the driver seat and communicating with the first upper vent channel 21 in the dash board, air can be discharged or returned through a first lower vent hole A2 formed toward the lower portion of the driver seat and communicating with the first lower vent channel 23. Further, air can be discharged or returned through a second upper vent hole A3 formed toward the upper portion of the passenger seat and communicating with the second upper vent channel 31 in the dash board, and air can be discharged or returned through a second lower vent hole A3 formed toward the lower portion of the passenger seat and communicating with the second lower vent channel 33.

The first upper vent channel 21 and the second upper vent channel 31 may be configured to discharge cooling air that has passed through the cooling unit 13, and the first lower vent channel 23 and the second lower vent channel 33 may be configured to discharge heating air that has passed through the heater unit 12.

To this end, ducts extending from the cooling unit 13 to the first upper vent channel 21 and the second upper vent channel 31, respectively, and ducts extending from the heater unit 12 to the first lower vent channel 23 and the second lower vent channel 33, respectively, may be separately formed in the air-conditioning unit 10. Since the cooling air and the heating air are divided up and down in this way, it is possible to separately provide the cooling air and the heating air and it is also possible to smoothly circulate conditioned-air for the first seat H1 or the second seat H2 simultaneously with return of the interior air.

On the other hand, as can be seen from FIG. 1, the air-conditioning unit 10 may include: an internal/external air door 14; a first return door 15 that determines whether to return the interior air to the blower 11 from the first air-conditioning channel unit 20; a second return door 16 that determines whether to return the interior air to the blower 11 from the second air-conditioning channel unit 30; a defrost channel 17; a defrost return channel 18 being open toward the blower 11 from the defrost channel 17; and a defrost door 19 selectively opening/closing the defrost channel 17 and the defrost return channel 18.

Introduction of external air and circulation of internal air are switched by the internal/external air door 14 disposed in an external air inlet 10a of the air-conditioning unit 10. Whether to re-circulate the interior air, which has been returned through the first upper return channel 22 and the first lower return channel 24 of the first air-conditioning channel unit 20, through the blower 11 is determined by the rotational position of the first return door 15, and whether to re-circulate the interior air, which has been returned through the second upper return channel 32 and the second lower return channel 34 of the second air-conditioning channel unit 30, through the blower 11 is determined by the second return door 16. That is, when the first return door 15 is closed, returning the interior air by operation of the blower 11 is not performed, and when the first return door 15 is open, the interior air can be returned and re-circulated by operation of the blower 11.

The defrost channel 17 is connected to the windshield and the defrost return channel 18 diverges from the defrost channel 17 and is open toward the blower 11. The defrost return channel can share a recirculation path with the first upper return channel 22 or the first lower vent channel 23, so circulation of returned air can be performed by opening/closing of the first return door 15. Since the defrost door 19 selectively opens/closes the defrost channel 17 and the defrost return channel 18, as described above, the conditioned-air can be discharged to the windshield or the interior air can be returned, depending on the opening/closing positions of the defrost door 19.

On the other hand, as shown in FIG. 3, the interior air returned through the first upper return channel 22, the first lower return channel 24, the second upper return channel 32, the second lower return channel 34, and the defrost return channel 18 can be re-circulated to the blower 11 through extension ducts D being open toward the blower 11.

As can be seen from FIG. 1, a return space 10b that communicates with the return channels may be provided in the air-conditioning unit 10, but, as shown in FIG. 3, the extension ducts D are provided for the return channels, respectively, whereby the returned conditioned-air can be smoothly re-circulated toward the blower 11 without interference with surrounding parts.

A control logic of the HVAC system of a vehicle according to one form of the present disclosure described above is described hereafter.

To this end, the HVAC system may further include a controller 100 that collects interior temperature information and passenger-sitting information and controls the temperature adjustment door T, the doors of the first air-conditioning channel unit 20, and the doors of the second air-conditioning channel unit 30 in accordance with operation modes according to the interior temperature and the passenger-sitting information. The controller 100 can collect interior temperature information through an interior temperature sensor and can collect the sitting information of passengers through pressure sensors disposed at the seats, etc. As can be seen from FIG. 20, the controller 100 is configured to control opening/closing of various doors.

The controller 100 can be implemented through a non-volatile memory (not shown) configured to store data about algorithms for controlling operation of various components of a vehicle or about software commands for executing the algorithms, and a processor (not shown) configured to perform operation to be described below using the data stored in the memory. The memory and the processor may be individual chips. Alternatively, the memory and the processor may be integrated in a single chip. The processor may be implemented as one or more processors.

Air circulation control based on information collected from various items of information by the controller 100 is as follows.

When the operation mode is a cooling mode and there is a passenger sitting in the first seat H1, the controller 100 controls the temperature adjustment door T such that conditioned-air passes through the cooling unit 13, and can control the first upper vent door 25 to open the first upper vent channel 21, the first lower vent door 26 to open the first lower return channel 24, the first return door 15 to open, and the other doors to close.

Figure 4:
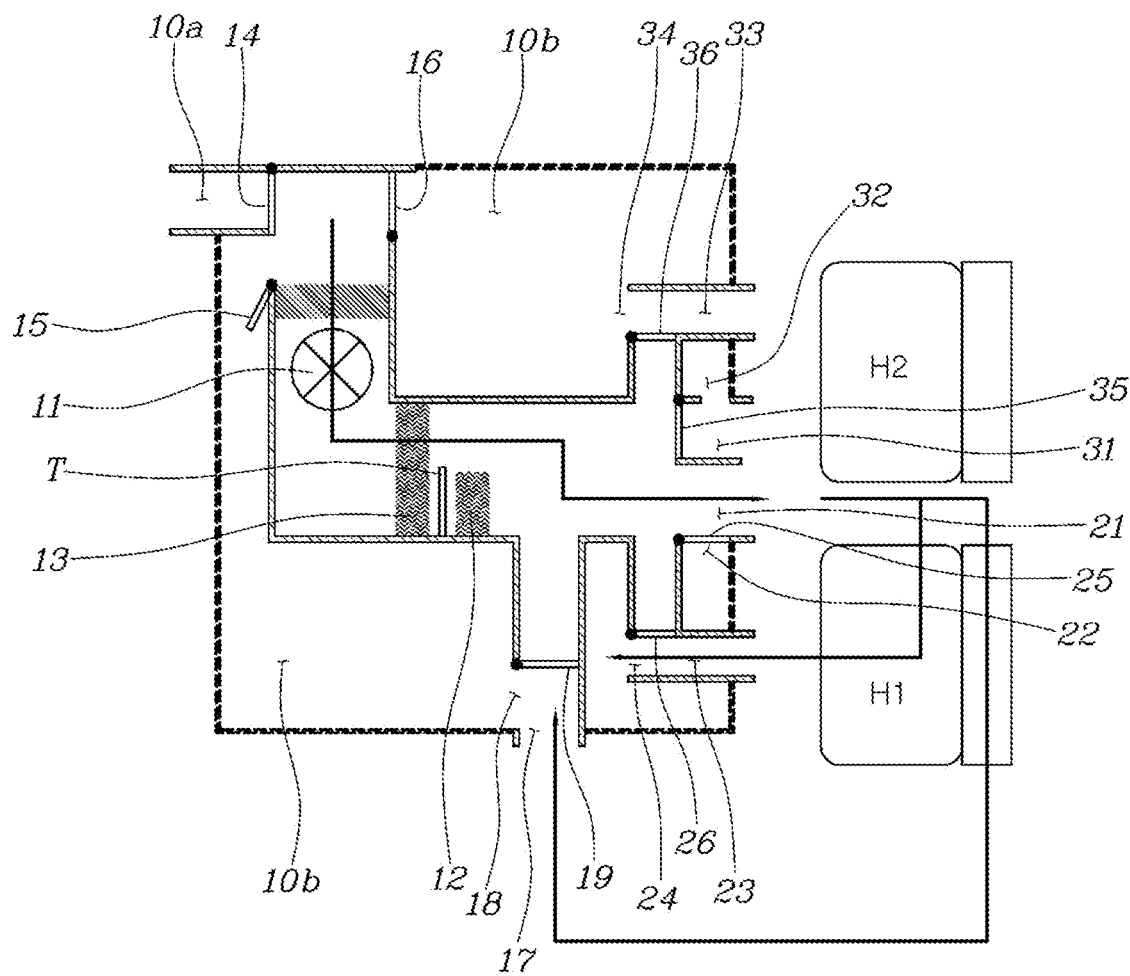
FIGS. 4 to 19 are views respectively illustrating the operation of various air-conditioning modes of the HVAC system of a vehicle shown in FIG. 1.

That is, as shown in FIG. 4, when cooling the interior is desired by a passenger operating an air-conditioning switch or a desired interior temperature, the controller 100 controls the temperature adjustment door T so that conditioned-air blown by the blower 11 passes through the cooling unit 13.

When there is a passenger only in the first seat H1, the controller 100 controls the first upper vent door 25 to open the first upper vent channel 21 and close the first upper return channel 22, the first lower vent door 26 to close the first lower vent channel 23 and open the first lower return channel 24, and the first return door 15 to open. Further, the controller 100 controls the second upper vent door 35 to close the second upper vent channel 31, the second lower vent door 36 to close the second lower vent channel 33, and the second return door 16 to close.

Figure 5:
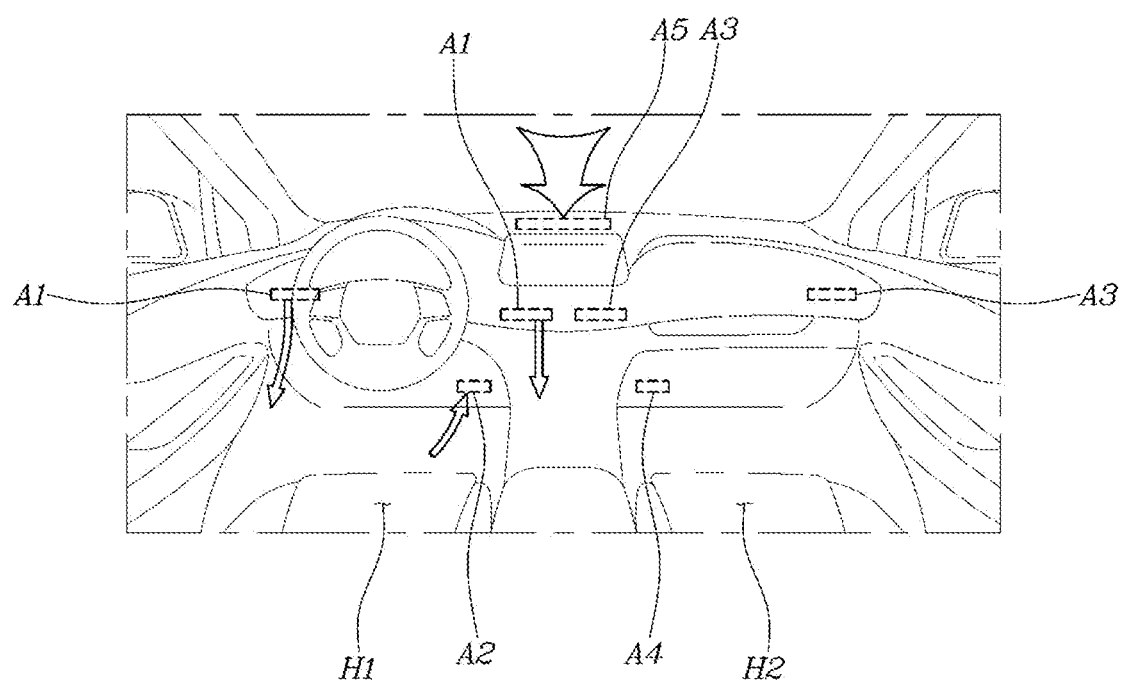

Accordingly, as shown in FIG. 5, cooling air is discharged toward the upper portion of the first seat H1 (through the first upper vent hole A1) and the interior air is returned from the lower portion of the first seat H1 (through the first lower vent hole A2), so the conditioned-air circulates only around the first seat H1.

The controller 100, in the cooling mode, can control the defrost door 19 to close the defrost channel 17 and open the defrost return channel 18. As the defrost return channel 18 is opened and the interior air is returned through the defrost vent hole A5 in the cooling mode, as described above, it is possible to increase the return rate of the conditioned-air and smoothly circulate the conditioned-air.

That is, cooling air is discharged toward only the upper portion of the first seat H1 (through the first upper vent hole A1), while it is returned simultaneously from the lower portion of the first seat H1 (through the first lower vent hole A2) and the defrost vent hole A5, so air can be returned as large amount as possible relative to discharge. Further, since a large amount of air is returned, the air that is discharged can be discharged more well without a loss of pressure and a passenger can feel circulation of conditioned air not only around a specific area, but also uniformly throughout the area from the head to the feet.

When a user wants to a defrosting function in the cooling mode, the controller 100 can control the defrost door 19 to open the defrost channel 17 and close the defrost return channel 18. Accordingly, conditioned-air is discharged to the windshield through the defrost vent hole A5 and the interior air is returned through all or some of the first lower vent hole A2, the second upper vent hole A3, and the second lower vent hole A4 except for the first upper vent hole A1 and the defrost vent hole A5, whereby the conditioned-air can circulate. As described above, it is possible to operate a defrosting function even in the cooling mode in accordance with an input from a user and it is possible to secure air-conditioning efficiency by circulating the conditioned-air.

When the operation mode is the cooling mode, there is a passenger sitting in the first seat H1, and it is desired to enhance return of the interior air, the controller 100 controls the temperature adjustment door T such that the conditioned-air passes through the cooling unit 13, and can control the first upper vent door 25 to open the first upper vent channel 21, the first lower vent door 26 to open the first lower return channel 24, the second upper vent door 35 to open the second upper return channel 32, the second lower vent door 36 to open the second lower return channel 34, and the first return door 15 and the second return door 16 to open. The condition that desires enhancement of return of the interior air may be the case when it is desired to quickly cool the interior or it is desired to secure air-conditioning efficiency for the first seat H1 rather than the second seat H2.

Figure 6:
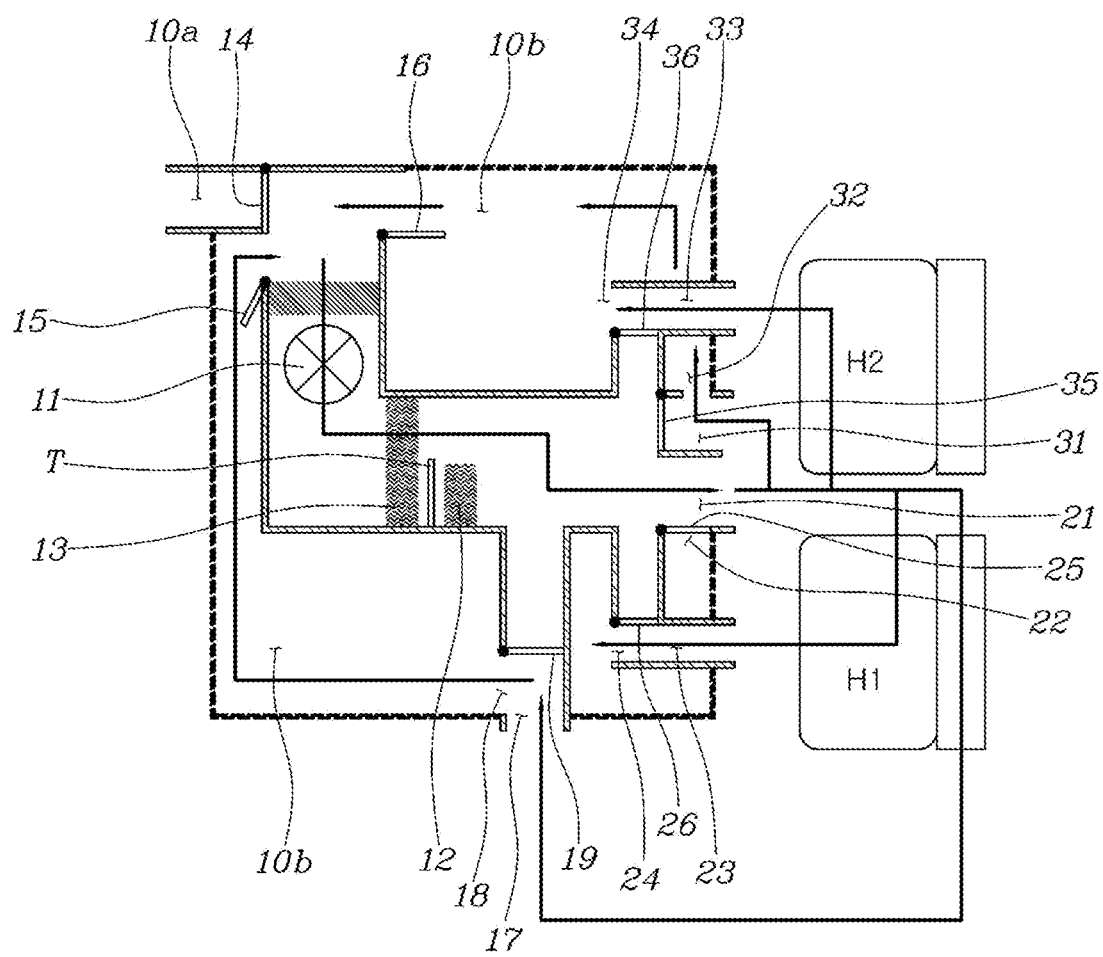

That is, as shown in FIG. 6, when cooling the interior is desired, the controller 100 controls the temperature adjustment door T so that air-conditioning air blown by the blower 11 passes through the cooling unit 13.

When there is a passenger only in the first seat H1, the controller 100 controls the first upper vent door 25 to open the first upper vent channel 21 and close the first upper return channel 22, controls the first lower vent door 26 to close the first lower vent channel 23 and open the first lower return channel 24, and opens the first return door 15. Further, the controller 100 controls the second upper vent door 35 to open the second upper return channel 32 and close the second upper return channel 32 and controls the second lower vent door 36 to open the second lower return channel 34 and close the second lower return channel 34.

Figure 7:
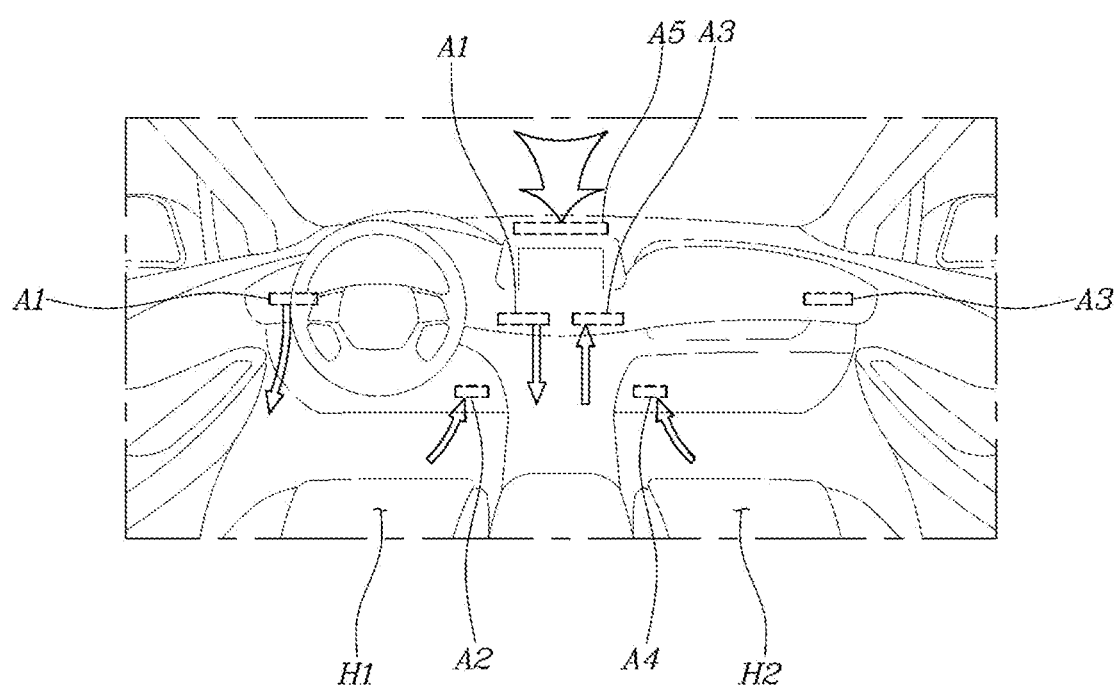

Accordingly, as shown in FIG. 7, cooling air is discharged toward the upper portion of the first seat H1 (through the first upper vent hole A1) and the interior air is returned from the lower portion of the first seat H1 (through the first lower vent hole A2), so the conditioned-air circulates only around the first seat H1. Further, the interior air is returned from the upper portion of the second seat H2 (through the second upper vent hole A3) and the lower portion of the second seat H2 (through the second lower vent hole A4).

On the other hand, when the operation mode is the cooling mode and there is a passenger sitting in the second seat H2, the controller 100 controls the temperature adjustment door T such that the conditioned-air passes through the cooling unit 13, and can control the first upper vent door 25 to open the first upper vent channel 21, the first lower vent door 26 to open the first lower return channel 24, the second upper vent door 35 to open the second upper vent channel 31, the second lower vent door 36 to open the second lower return channel 34, and the first return door 15 and the second return door 16 to open.

Figure 8:
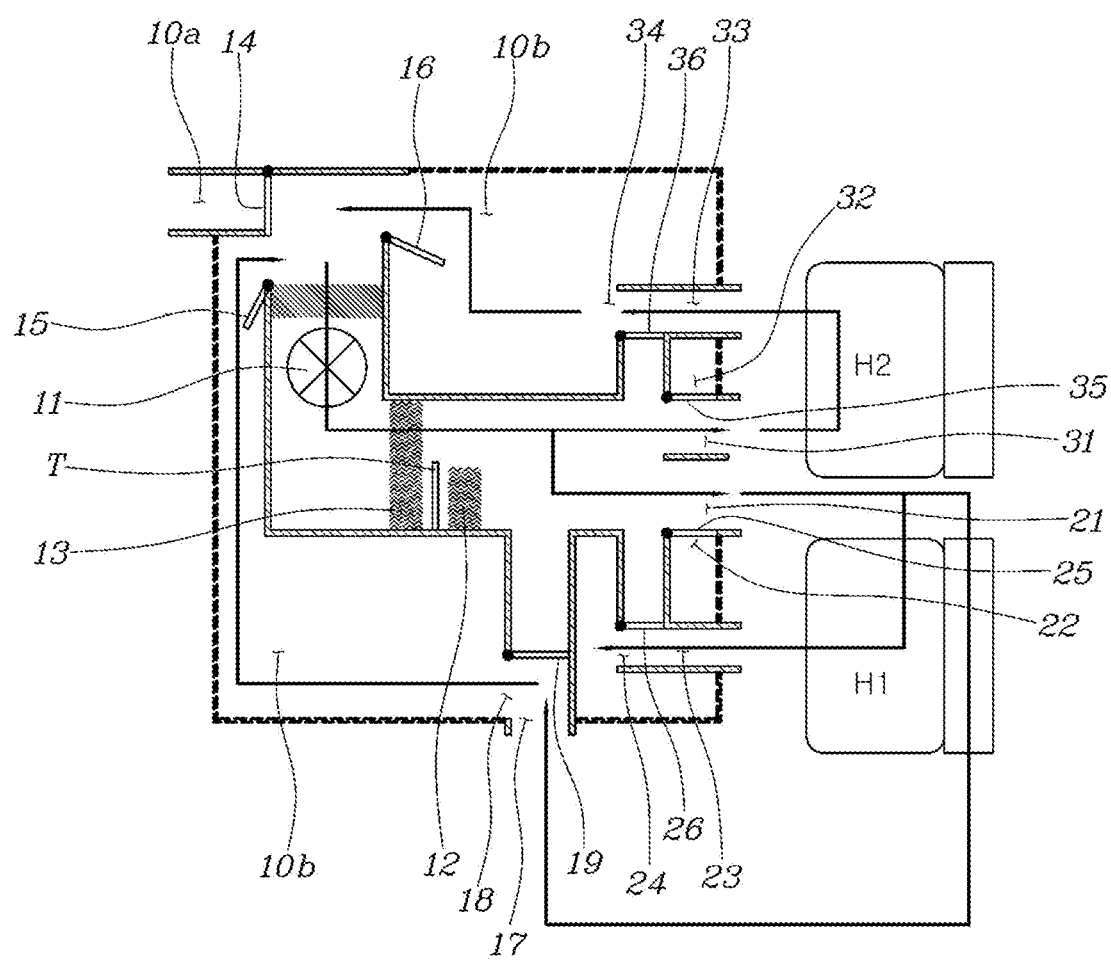

That is, as shown in FIG. 8, when cooling the interior is desired, the controller 100 controls the temperature adjustment door T so that air-conditioning air blown by the blower 11 passes through the cooling unit 13.

When there are passengers in the first seat H1 and the second seat H2, the controller 100 controls the first upper vent door 25 to open the first upper vent channel 21 and close the first upper return channel 22, controls the first lower vent door 26 to close the first lower vent channel 23 and open the first lower return channel 24, and opens the first return door 15. Further, the controller 100 controls the second upper vent door 35 to open the second upper vent channel 31 and close the second upper return channel 32, the second lower vent door 36 to close the second lower vent channel 33 and open the second lower return channel 34, and the second return door 16 to open.

Figure 9:
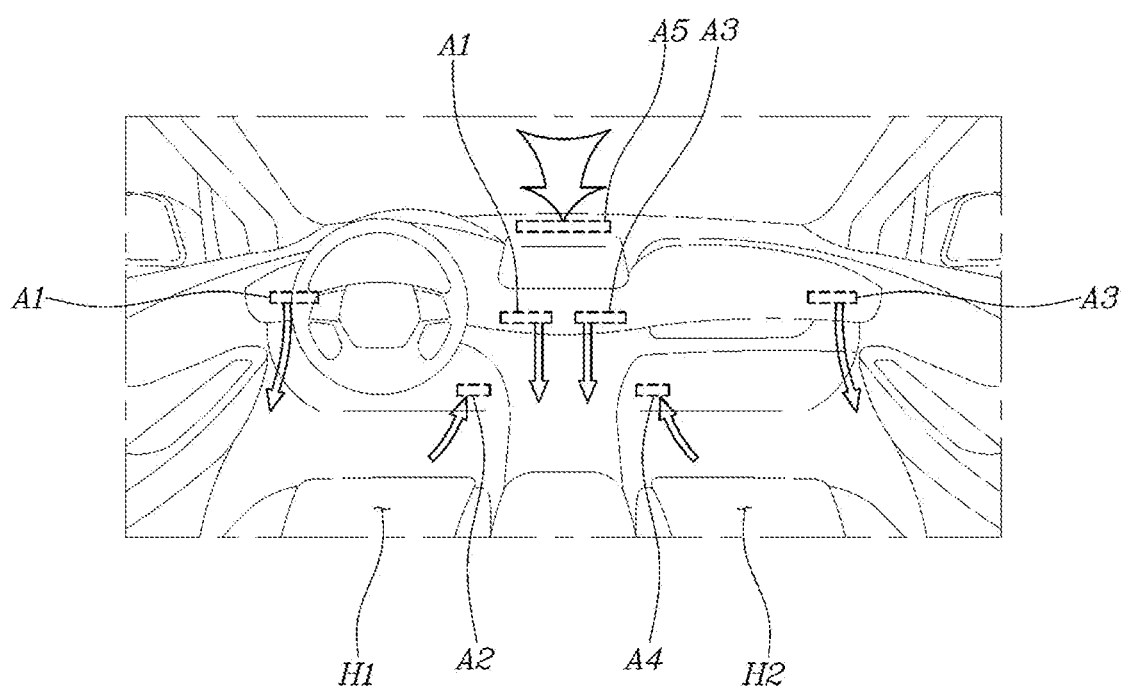

Accordingly, as shown in FIG. 9, cooling air is discharged toward the upper portion of the first seat H1 (through the first upper vent hole A1) and toward the upper portion of the second seat H2 (through the second upper vent hole A3), while the interior air is returned from the lower portion of the first seat H1 (through the first lower vent hole A2) and from the lower portion of the second seat H2 (through the second lower vent hole A4). Accordingly, cooling is performed while the conditioned-air circulates around both of the first seat H1 and the second seat H2.

As described above, the cooling air discharged from the center portion of the dashboard is divided and circulated up and down in interior cooling, whereby cooling efficiency is improved.

On the other hand, when the operation mode is a heating mode and there is a passenger sitting in the first seat H1, the controller 100 controls the temperature adjustment door T such that conditioned-air passes through the heater unit 12, and can control the internal/external air door 14 to open, the first upper vent door 25 to open the first upper return channel 22, the first lower vent door 26 to open the first lower vent channel 23, and the first return door 15 to open.

Figure 10:
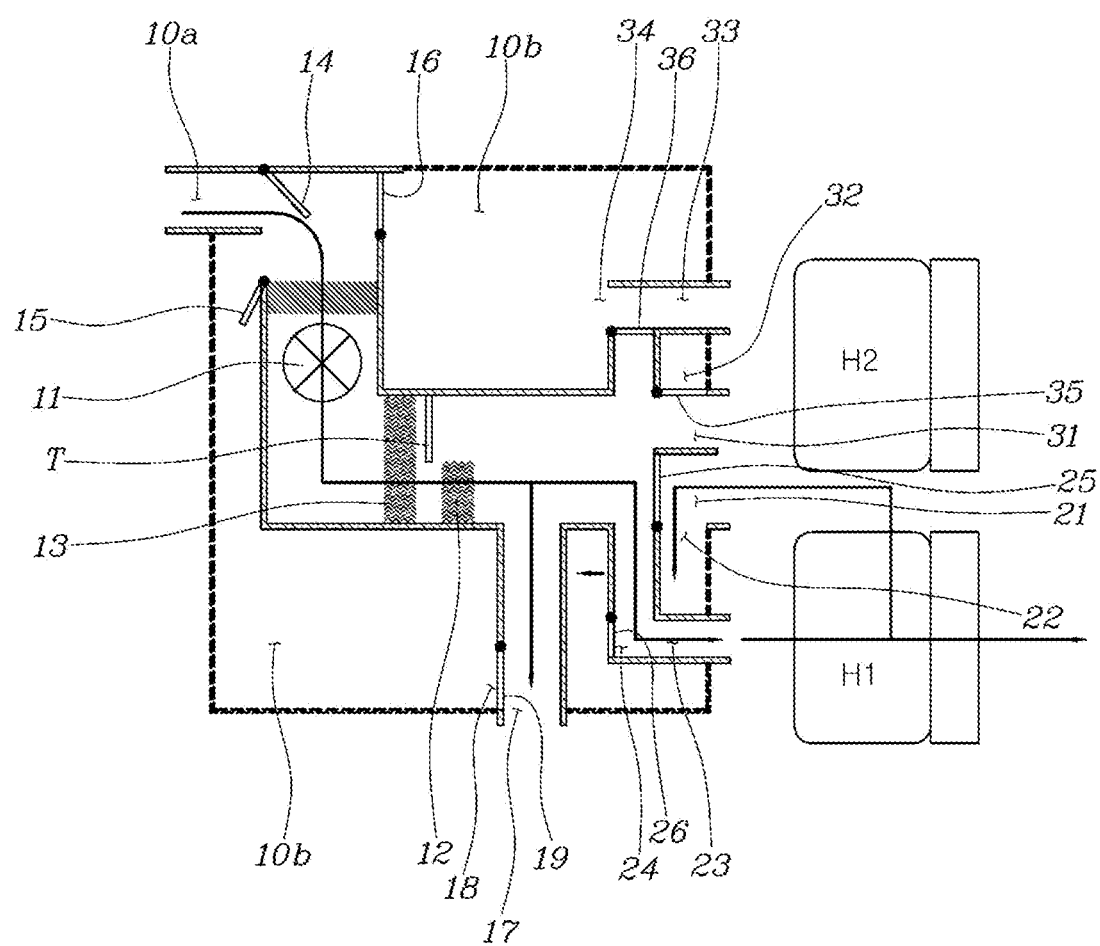

That is, as shown in FIG. 10, when heating the interior is desired, the controller 100 opens the internal/external air door 14 to introduce external air and controls the temperature adjustment door T so that the conditioned-air blown by the blower 11 passes through the heater unit 12.

When there is a passenger only in the first seat H1, the controller 100 controls the first upper vent door 25 to close the first upper vent channel 21 and open the first upper return channel 22, the first lower vent door 26 to open the first lower vent channel 23 and close the first lower return channel 24, and the first return door 15 to open. Further, the controller 100 controls the second upper vent door 35 to close the second upper vent channel 31, the second lower vent door 36 to close the second lower vent channel 33, and the second return door 16 to close.

Figure 11:
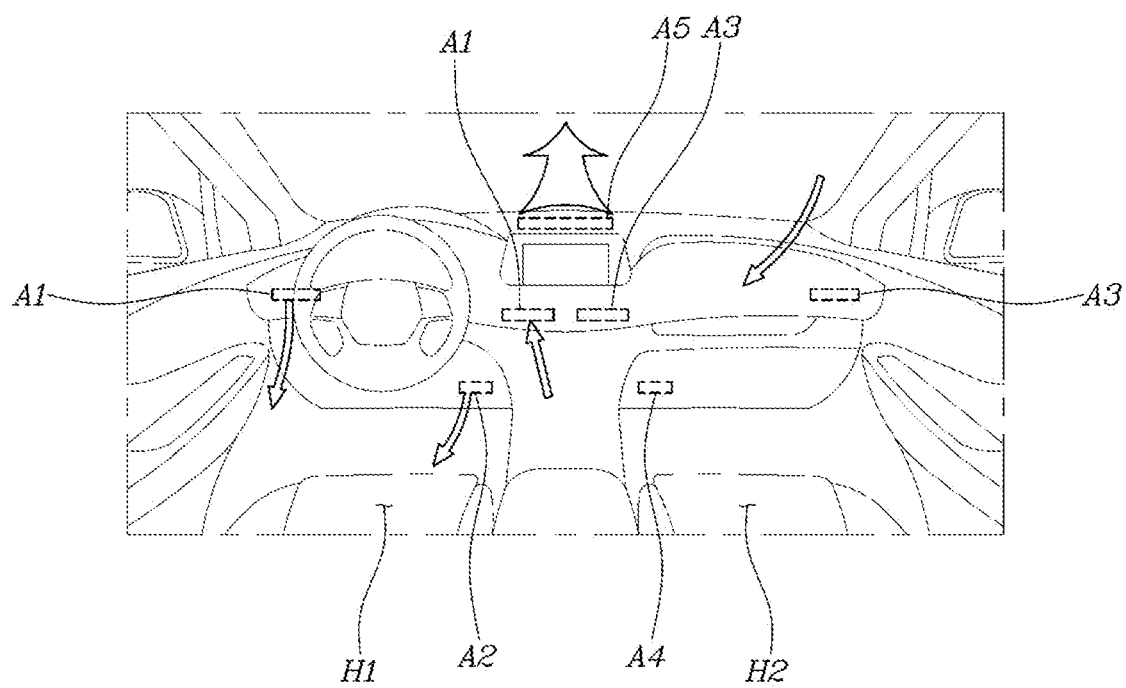

Accordingly, as shown in FIG. 11, heating air is discharged toward the lower portion of the first seat H1 (through the first lower vent hole A2) and the interior air is returned from the upper portion of the first seat H1 (through the first upper vent hole A1). Further, the controller 100, in the heating mode, controls the defrost door 19 to open the defrost channel 17 and close the defrost return channel 18, whereby the circulation rate of the conditioned-air is improved. Further, since the internal/external air door 14 is opened, some of the heating air is discharged outside, thereby being able to supply fresh air to the driver.

When the operation mode is the heating mode, there is a passenger sitting in the first seat H1, and it is desired to enhance return of the interior air, the controller 100 controls the temperature adjustment door T such that the conditioned-air passes through the heater unit 12, opens the internal/external air door 14, and can control the first upper vent door 25 to open the first upper return channel 22, the first lower vent door 26 to open the first lower vent channel 23, the second upper vent door 35 to open the second upper return channel 32, the second lower vent door 36 to open the second lower return channel 34, and the first return door 15 and the second return door 16 to open. The condition that desires enhancement of return of the interior air may be the case when it is desired to quickly heat the interior or it is desired to secure air-conditioning efficiency for the first seat H1 rather than the second seat H2.

Figure 12:
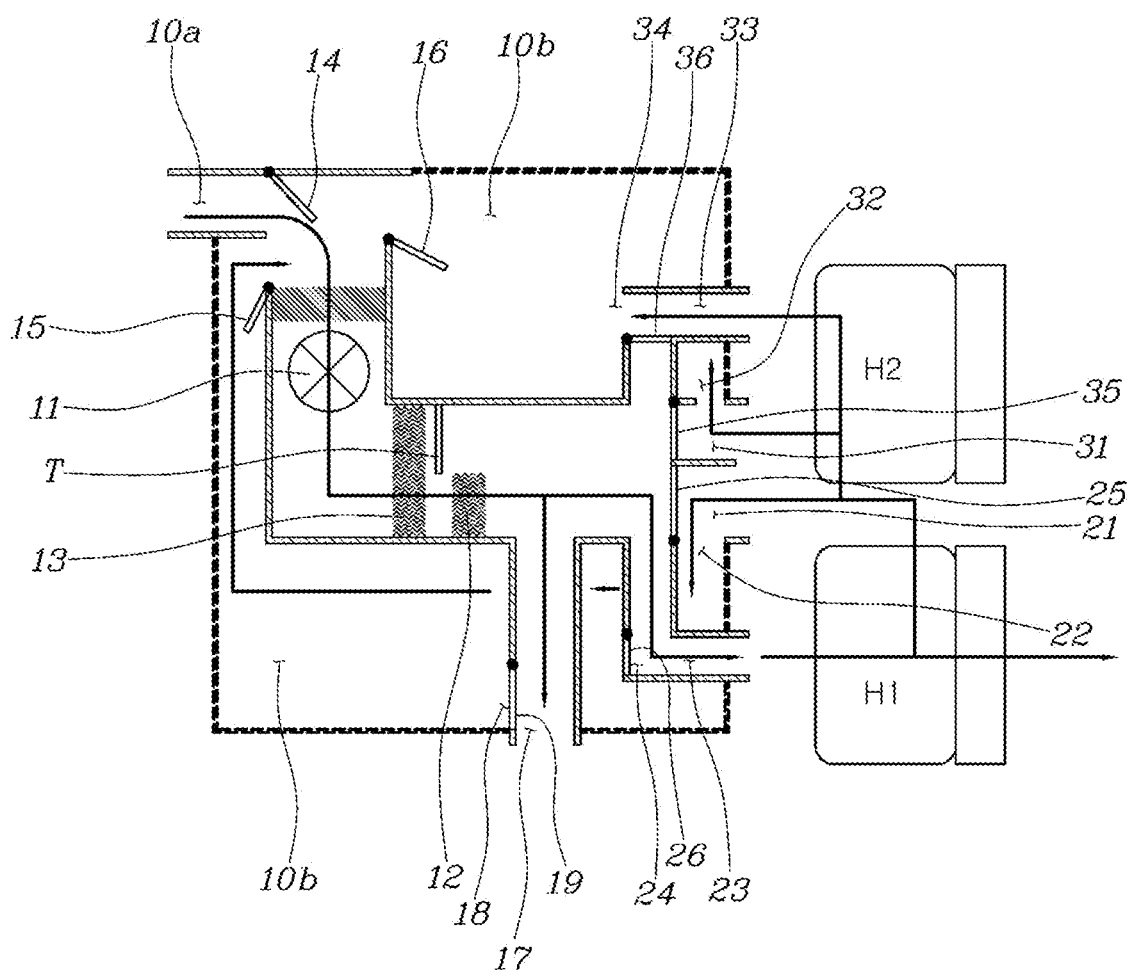

That is, as shown in FIG. 12, when heating the interior is desired, the controller 100 opens the internal/external air door 14 to introduce external air and controls the temperature adjustment door T so that the conditioned-air blown by the blower 11 passes through the heater unit 12.

When there is a passenger only in the first seat H1, the controller 100 controls the first upper vent door 25 to close the first upper vent channel 21 and open the first upper return channel 22, the first lower vent door 26 to open the first lower vent channel 23 and close the first lower return channel 24, and the first return door 15 to open. Further, the controller 100 controls the second upper vent door 35 to open the second upper return channel 32 and close the second upper vent channel 31 and the second lower vent door 36 to open the second lower return channel 34 and close the second lower vent channel 33.

Figure 13:
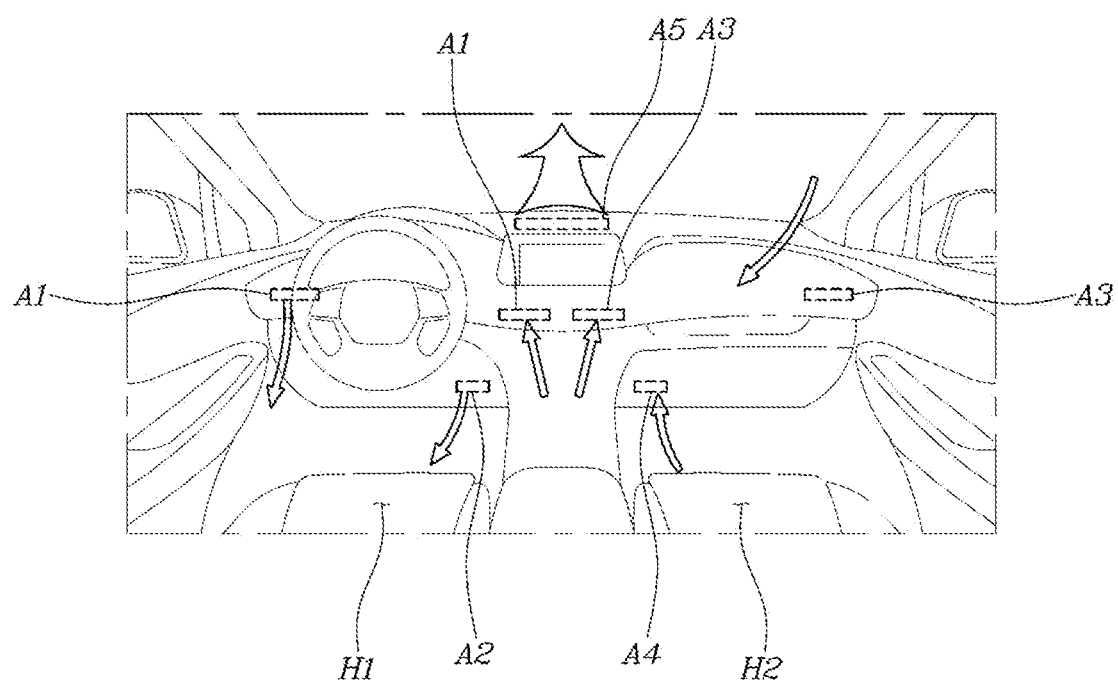

Accordingly, as shown in FIG. 13, cooling air is discharged toward the lower portion of the first seat H1 (through the first lower vent hole A2) and the interior air is returned from the upper portion of the first seat H1 (through the first upper vent hole A1), so the conditioned-air circulates only around the first seat H1. Further, the interior air is returned from the upper portion of the second seat H2 (through the second upper vent hole A3) and the lower portion of the second seat H2 (through the second lower vent hole A4), whereby the return ratio of the interior air is improved.

On the other hand, when the operation mode is the heating mode and there are passengers sitting in the first seat H1 and the second seat H2, the controller 100 controls the temperature adjustment door T such that the conditioned-air passes through the heater unit 12, and can control the first upper vent door 25 to open the first upper return channel 22, the first lower vent door 26 to open the first lower vent channel 23, the second upper vent door 35 to open the second upper return channel 32, the second lower vent door 36 to open the second lower vent channel 33, and the first return door 15 and the second return door 16 to open.

Figure 14:
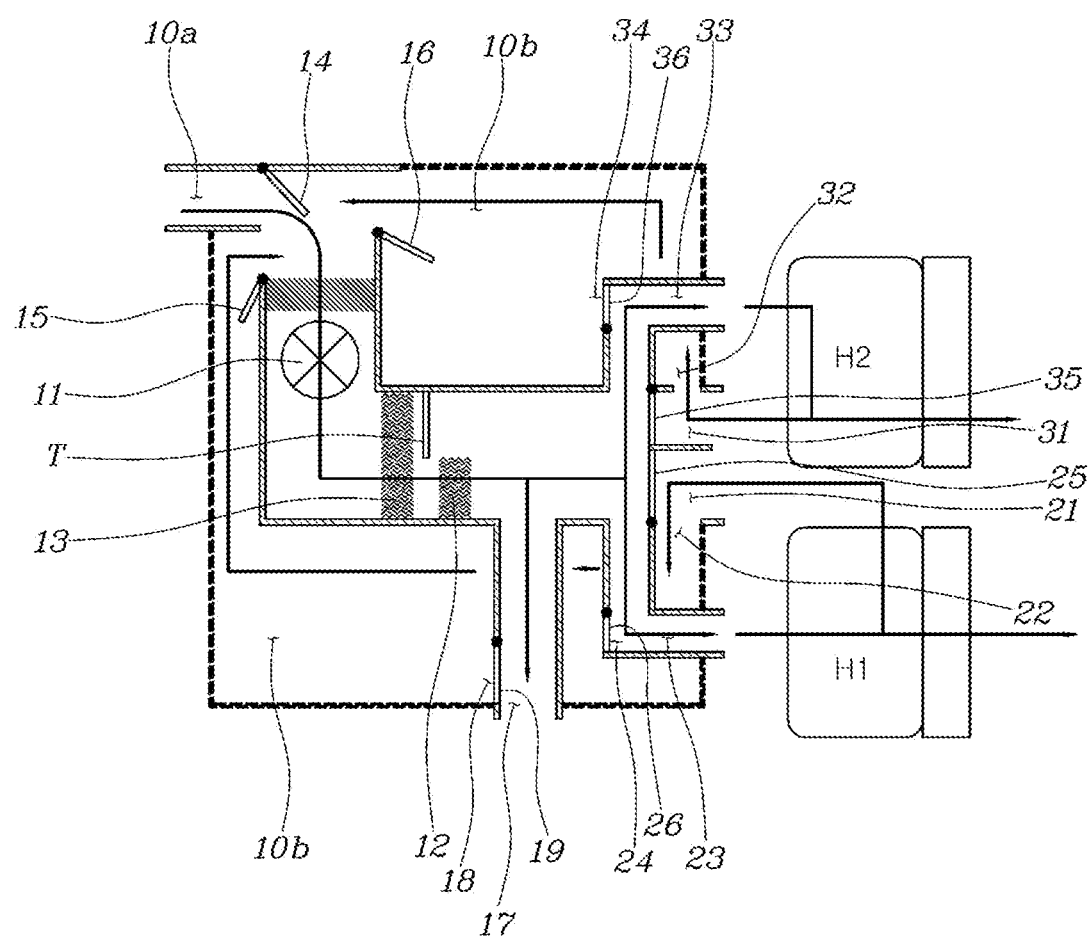

That is, as shown in FIG. 14, when heating the interior is desired, the controller 100 opens the internal/external air door 14 to introduce external air and controls the temperature adjustment door T so that the conditioned-air blown by the blower 11 passes through the heater unit 12.

When there are passengers in the first seat H1 and the second seat H2, the controller 100 controls the first upper vent door 25 to close the first upper vent channel 21 and open the first upper return channel 22, the first lower vent door 26 to open the first lower vent channel 23 and close the first lower return channel 24, and the first return door 15 to open. Further, the controller 100 controls the second upper vent door 35 to close the second upper vent channel 31 and open the second upper return channel 32, the second lower vent door 36 to open the second lower vent channel 33 and close the second lower return channel 34, and the second return door 16 to open.

Figure 15:
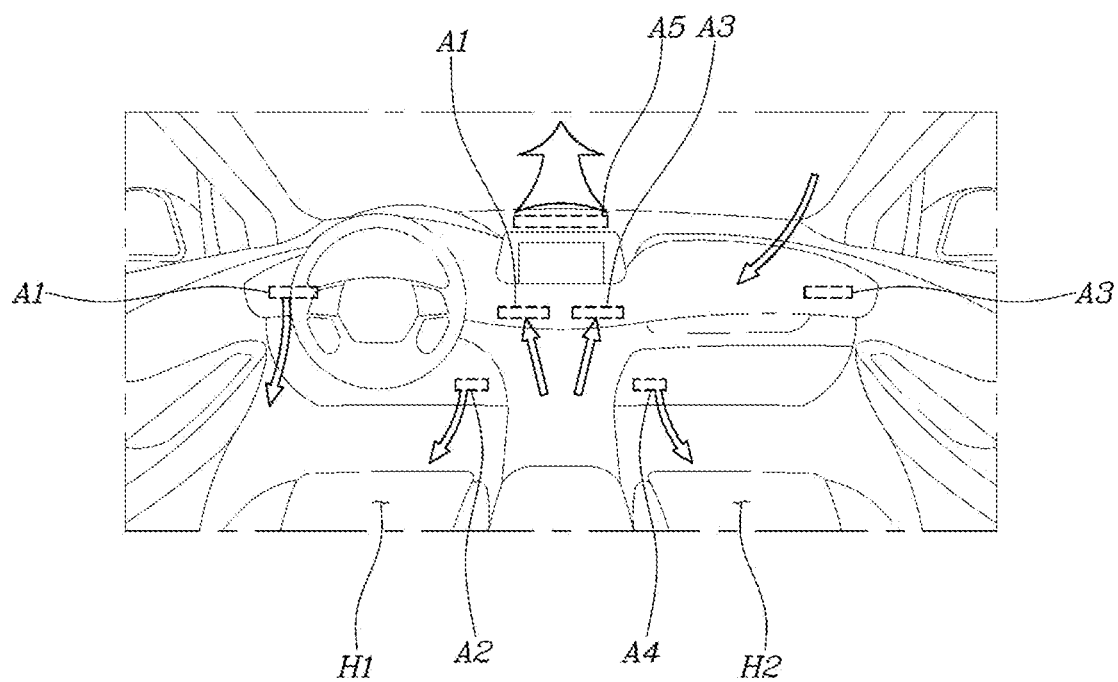

Accordingly, as shown in FIG. 15, cooling air is discharged toward the upper portion of the first seat H1 (through the first lower vent hole A2) and toward the upper portion of the second seat H2 (through the second lower vent hole A4), while the interior air is returned from the upper portion of the first seat H1 (through the first upper vent hole A1) and from the upper portion of the second seat H2

(through the second upper vent hole A3), whereby both of the first seat H1 and the second seat H2 can be heated by circulation of the conditioned-air.

As described above, in interior heating, heating air is discharged from the upper and lower portions of the dash board and some of the air is returned through the center portion of the dash board, so the heating air can smoothly circulate.

On the other hand, when there is a passenger sitting in the first seat H1 and the operation mode is a temperature adjustment mode of the interior air, the controller 100 controls the temperature adjustment door T such that conditioned-air passes through the cooling unit 13 and the heater unit 12, and can control the internal/external door 14 to open, the first upper vent door 25 to open the first upper vent channel 21, the first lower vent door 26 to open the first lower vent channel 23, and the first return door 15 to open.

The temperature adjustment mode discharges both of cooling air and heating air, in which the position of the temperature adjustment door T is adjusted in accordance with the desired interior temperature so that the temperature of the conditioned-air passing through the cooling unit 13 and the heater unit 12.

Figure 16:
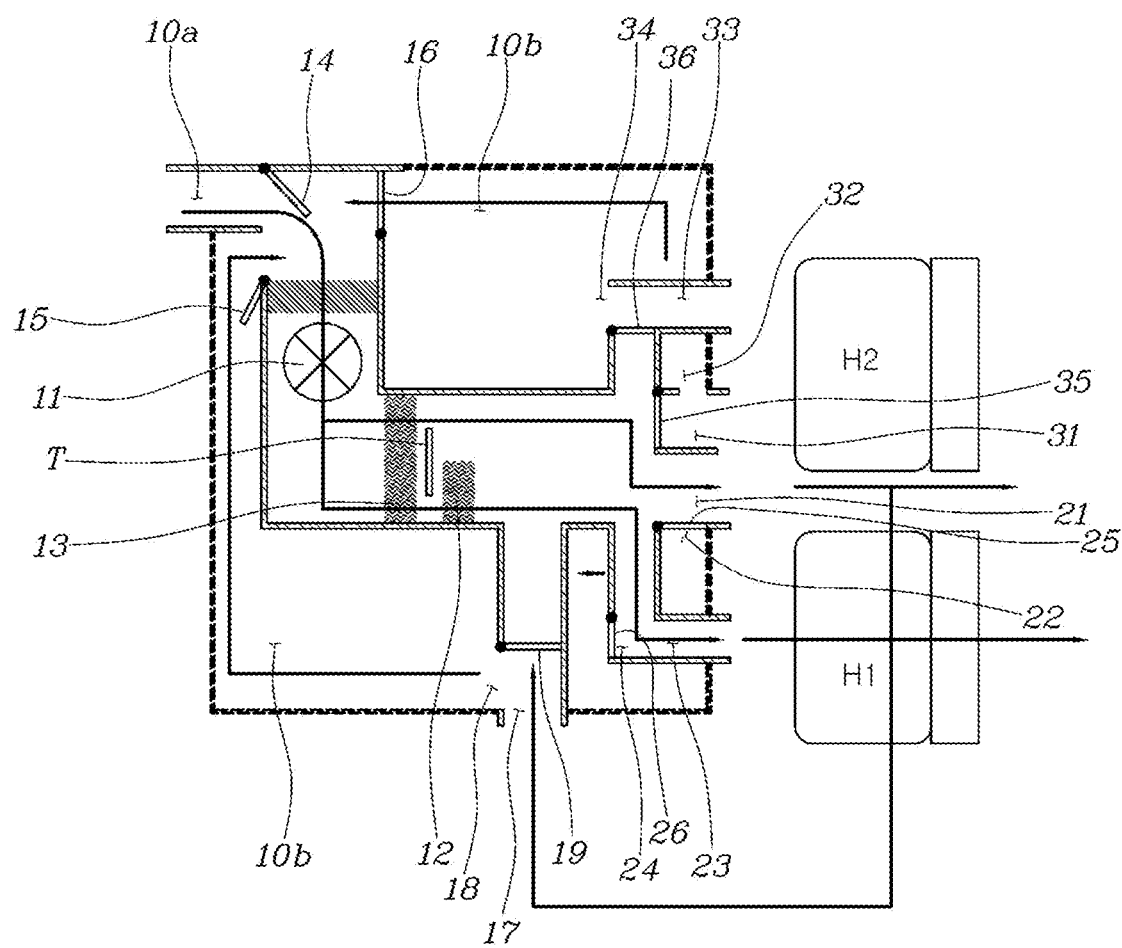

That is, as shown in FIG. 16, when the operation mode is the temperature adjustment mode of the interior air, the controller 100 opens the internal/external air door 14 to introduce external air and controls the temperature adjustment door T so that the temperature of the conditioned-air blown by the blower 11 is adjusted through the heater unit 12 and the cooling unit 13.

When there is a passenger in the first seat H1, the controller 100 controls the first upper vent door 25 to open the first upper vent channel 21 and close the first upper return channel 22, and the first lower vent door 26 to open the first lower vent channel 23 and close the first lower return channel 24. Further, the controller 100 controls the second upper vent door 35 to close the second upper vent channel 31, the second lower vent door 36 to close the second lower vent channel 33, and the second return door 16 to close.

Further, when the operation mode is the temperature adjustment mode of the interior air, the controller 100 controls the defrost door 19 to open the defrost return channel 18 and close the defrost channel 17, whereby the interior air can be returned through the defrost vent hole A5. That is, when the operation mode is the temperature adjustment mode of the interior air, both of the first upper vent channel 21 and the first lower vent channel 23 are opened such that conditioned-air is discharged, and the defrost return channel 18 is opened such that the interior air is returned through the defrost return channel 18, whereby the conditioned-air circulates.

Figure 17:
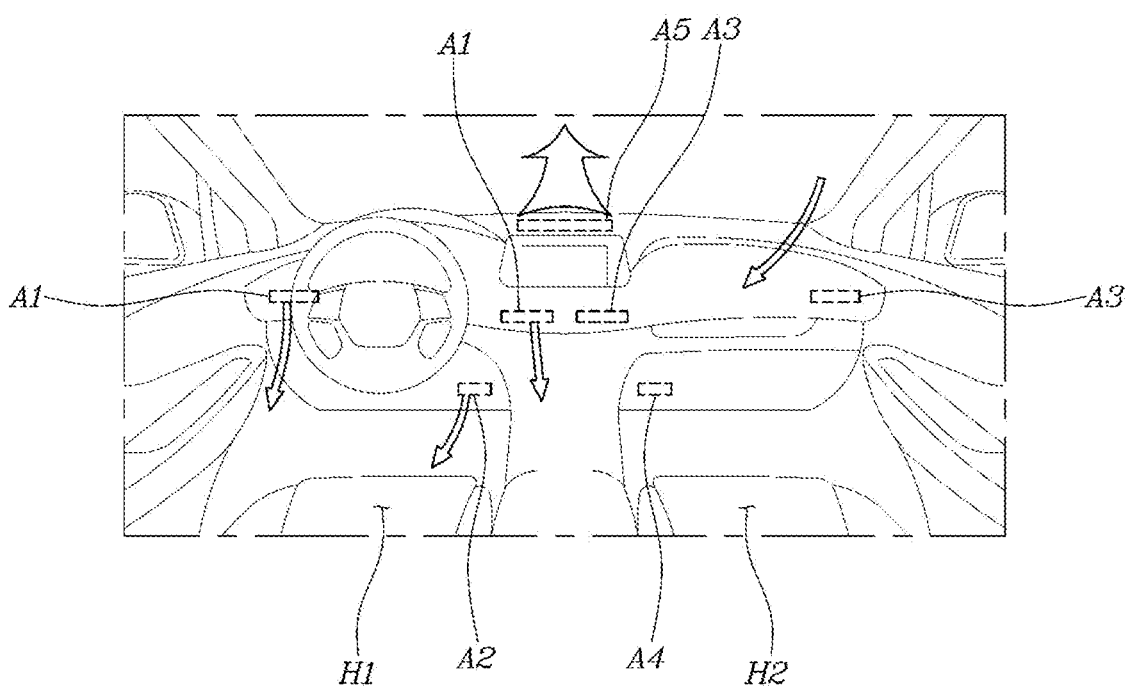

Accordingly, as shown in FIG. 17, conditioned-air is discharged toward the upper portion of the first seat H1 (through the first upper vent hole A1) and the lower portion of the first seat H1 (through the first lower vent hole A2), and the interior air is returned from the defrost vent hole A5, so the conditioned-air can circulate only around the first seat H1.

On the other hand, when there are passengers sitting in the first seat H1 and the second seat h2 and the operation mode is the temperature adjustment mode of the interior air, the controller 100 controls the temperature adjustment door T such that conditioned-air passes through the cooling unit 13 and the heater unit 12, and can control the internal/external door 14 to open, the first upper vent door 25 to open the first upper vent channel 21, the first lower vent door 26 to open the first lower vent channel 23, the second upper vent door 35 to open the second upper vent channel 31, the second lower vent door 36 to open the second lower vent channel 33, and the first return door 15 and the second door 16 to open.

Figure 18:
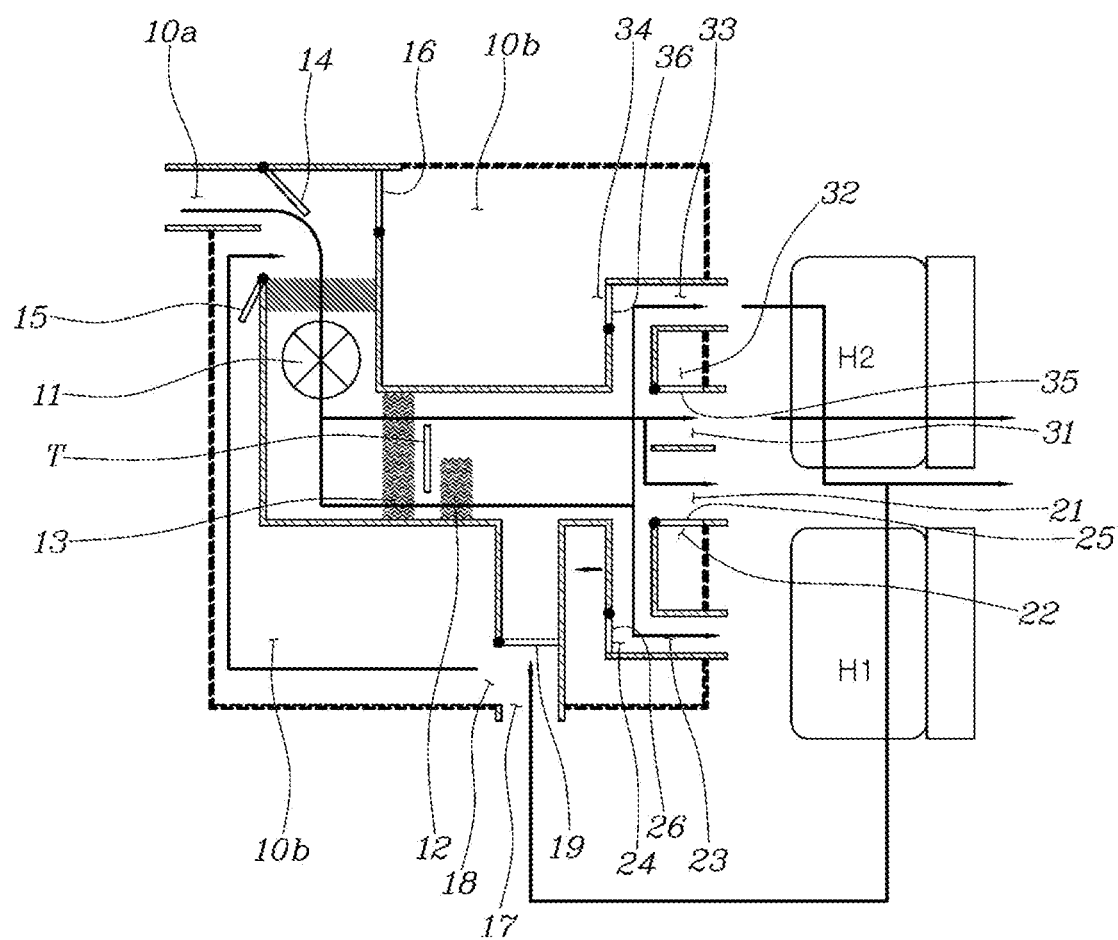

That is, as shown in FIG. 18, when the operation mode is the temperature adjustment mode of the interior air, the controller 100 opens the internal/external air door 14 to introduce external air and controls the temperature adjustment door T so that the temperature of the conditioned-air blown by the blower 11 is adjusted through the heater unit 12 and the cooling unit 13.

When there are passengers in the first seat H1 and the second seat H2, the controller 100 controls the first upper vent door 25 to open the first upper vent channel 21 and close the first upper return channel 22, and the first lower vent door 26 to open the first lower vent channel 23 and close the first lower return channel 24. Further, the controller 100 controls the second upper vent door 35 to open the second upper vent channel 31 and close the second upper return channel 32 and the second lower vent door 36 to open the second lower vent channel 33 and close the second lower return channel 34. Further, when the operation mode is the temperature adjustment mode of the interior air, the controller 100 controls the defrost door 19 to open the defrost return channel 18 and close the defrost channel 17, whereby the interior air is returned through the defrost return channel 18.

Accordingly, as shown in FIG. 19, conditioned-air is discharged toward the upper portion of the first seat H1 (through the first upper vent hole A1), the lower portion of the first seat H1 (through the first lower vent hole A2), the upper portion of the second seat H2 (through the second upper vent hole A3), and the lower portion of the second seat H2 (through the second lower vent hole A4), and the interior air is returned through the defrost vent hole A5, whereby the conditioned-air can circulate around the first seat H1 and the second seat H2.

As described above, according to the present disclosure, it is possible to provide conditioned-air to passengers in accordance with situations of cooling, heating, and temperature adjusting, and individually providing conditioned-air to seats, depending on whether there are passengers, so a waste of energy for cooling and heating is prevented and the air-conditioning efficiency is increased. As the air-conditioning efficiency is increased, the range of an electric vehicle increases.

Although the present disclosure was provided above in relation to specific forms shown in the drawings, it is apparent to those skilled in the art that the present disclosure may be changed and modified in various ways without departing from the scope of the present disclosure.

What is claimed is:

1. A heating, ventilation, and air conditioning (HVAC) system of a vehicle, comprising:
   an air-conditioning unit including a blower, a heater unit, and a cooling unit, and a temperature adjustment door making conditioned-air pass through the heater unit or the cooling unit; and
   an air-conditioning channel unit including:
      a first air-conditioning channel unit having a plurality of first discharge channels through which conditioned-air is discharged to a first seat and returned from the first seat to be re-circulated,
      a second air-conditioning channel unit having a plurality of second discharge channels through which conditioned-air is discharged to a second seat and returned from the second seat to be re-circulated, and doors respectively disposed in the plurality of first and second discharge channels to control discharging and returning of the air-conditioned air from the first seat or from the second seat, respectively.

2. The HVAC system of claim 1, wherein the doors include a plurality of first doors respectively disposed in the plurality of first discharge channels; and the doors include a plurality of second doors respectively disposed in the plurality of second discharge channels.

3. The HVAC system of claim 2, wherein the plurality of first discharge channels of the first air-conditioning channel unit includes: a first upper vent channel being open toward an upper portion of the first seat, a first upper return channel being open toward the blower from the first upper vent channel, a first lower vent channel being open toward a lower portion of the first seat, and a first lower return channel being open toward the blower from the first lower vent channel; and the plurality of first doors of the first air-conditioning channel unit include: a first upper vent door selectively opening and closing the first upper vent channel or first upper return channel, and a first lower vent door selectively opening and closing the first lower vent channel or the first lower return channel.

4. The HVAC system of claim 3, wherein the plurality of second discharge channels of the second air-conditioning channel unit includes: a second upper vent channel being open toward an upper portion of the second seat, a second upper return channel being open toward the blower from the second upper vent channel, a second lower vent channel being open toward a lower portion of the second seat, and a second lower return channel being open toward the blower from the second lower vent channel; and the plurality of second doors of the second air-conditioning channel unit include: a second upper vent door selectively opening and closing the second upper vent channel or second upper return channel, and a second lower vent door selectively opening and closing the second lower vent channel or the second lower return channel.

5. The HVAC system of claim 4, wherein the first upper vent channel and the second upper vent channel are configured to discharge cooling air that has passed through the cooling unit, and the first lower vent channel and the second lower vent channel are configured to discharge heating air that has passed through the heater unit.

6. The HVAC system of claim 4, wherein the air-conditioning unit includes: an internal/external air door; a first return door determining whether to return interior air to the blower from the first air-conditioning channel unit; a second return door determining whether to return the interior air to the blower from the second air-conditioning channel unit; a defrost channel; a defrost return channel being open toward the blower from the defrost channel; and a defrost door selectively opening and closing the defrost channel and the defrost return channel.

7. The HVAC system of claim 6, wherein the interior air returned through the first upper return channel, the first lower return channel, the second upper return channel, the second lower return channel, and the defrost return channel is re-circulated to the blower through extension ducts being open toward the blower.

8. The HVAC system of claim 6, further comprising: a controller configured to:

collect interior temperature information and passenger-sitting information, and control the temperature adjustment door, the doors of the first air-conditioning channel unit, and the doors of the second air-conditioning channel unit based on an operation mode based on the interior temperature and the passenger-sitting information.

9. The HVAC system of claim 8, wherein when the operation mode is a cooling mode and a passenger is sitting in the first seat, the controller is configured to:

control the temperature adjustment door such that conditioned-air passes through the cooling unit, and control the first upper vent door to open the first upper vent channel, the first lower vent door to open the first lower return channel, the first return door to open, and the other doors to close.

10. The HVAC system of claim 8, wherein when the operation mode is a cooling mode, a passenger is sitting in the first seat, and it is required to enhance return of the interior air, the controller is configured to:

control the temperature adjustment door such that conditioned-air passes through the cooling unit, and control the first upper vent door to open the first upper vent channel, the first lower vent door to open the first lower return channel, the second upper vent door to open the second upper return channel, the second lower vent door to open the second lower return channel, and the first return door and the second return door to open.

11. The HVAC system of claim 8, wherein when the operation mode is a cooling mode and passengers are sitting in the first seat and the second seat, the controller is configured to:

control the temperature adjustment door such that conditioned-air passes through the cooling unit, and control the first upper vent door to open the first upper vent channel, the first lower vent door to open the first lower return channel, the second upper vent door to open the second upper vent channel, the second lower vent door to open the second lower return channel, and the first return door and the second return door to open.

12. The HVAC system of claim 8, wherein, in a cooling mode, the controller is configured to control the defrost door to close the defrost channel and open the defrost return channel.

13. The HVAC system of claim 8, wherein when the operation mode is a heating mode and a passenger is sitting in the first seat, the controller is configured to:

control the temperature adjustment door such that conditioned-air passes through the heater unit, and control the internal/external air door to open, the first upper vent door to open the first upper return channel, the first lower vent door to open the first lower vent channel, and the first return door to open.

14. The HVAC system of claim 8, wherein when the operation mode is a heating mode, a passenger is sitting in the first seat, and it is required to enhance return of the interior air, the controller is configured to:

control the temperature adjustment door such that conditioned-air passes through the heater unit, and control the internal/external air door to open, the first upper vent door to open the first upper return channel, the first lower vent door to open the first lower vent channel, the second upper vent door to open the second upper return channel, the second lower vent door to open the second lower return channel, and the first return door and the second return door to open.

15. The HVAC system of claim 8, wherein when the operation mode is a heating mode and passengers are sitting in the first seat and the second seat, the controller is configured to:
- control the temperature adjustment door such that conditioned-air passes through the heater unit, and
- control the first upper vent door to open the first upper return channel, the first lower vent door to open the first lower vent channel, the second upper vent door to open the second upper return channel, the second lower vent door to open the second lower vent channel, and the first return door and the second return door to open.

16. The HVAC system of claim 8, wherein, in a heating mode, the controller is configured to control the defrost door to open the defrost channel and close the defrost return channel.

17. The HVAC system of claim 8, wherein when a passenger is sitting in the first seat and the operation mode is a temperature adjustment mode of the interior air, the controller is configured to:
- control the temperature adjustment door such that conditioned-air passes through the heater unit, and
- control the internal/external air door to open, the first upper vent door to open the first upper vent channel, the first lower vent door to open the first lower vent channel, and the first return door to open.

18. The HVAC system of claim 8, wherein when passengers are sitting in the first seat and the second seat and the operation mode is a temperature adjustment mode of the interior air, the controller is configured to:
- control the temperature adjustment door such that conditioned-air passes through the cooling unit and heater unit, and
- control the internal/external air door to open, the first upper vent door to open the first upper vent channel, the first lower vent door to open the first lower vent channel, the second upper vent door to open the second upper vent channel, the second lower vent door to open the second lower vent channel, and the first return door and the second return door to open.

19. The HVAC system of claim 8, wherein, in a temperature adjustment mode of the interior air, the controller is configured to control the defrost door to open the defrost return channel and close the defrost channel.

\* \* \* \* \*